United States Patent
Foster et al.

(10) Patent No.: US 7,130,810 B2
(45) Date of Patent: Oct. 31, 2006

(54) METHOD AND SYSTEM FOR PROPERTY VALUATION IN AN ON-LINE COMPUTING ENVIRONMENT

(75) Inventors: Paul Foster, New York, NY (US); Robert Rieger, Trumbull, CT (US); David Shea, New Canaan, CT (US)

(73) Assignee: General Electrical Capital Corp, Stamford, CT (US)

( * ) Notice: Subject to any disclaimer, the term of this patent is extended or adjusted under 35 U.S.C. 154(b) by 1062 days.

(21) Appl. No.: 09/766,779

(22) Filed: Jan. 22, 2001

(65) Prior Publication Data
US 2004/0073508 A1 Apr. 15, 2004

Related U.S. Application Data

(60) Provisional application No. 60/249,985, filed on Nov. 20, 2000.

(51) Int. Cl.
*G06Q 40/00* (2006.01)
(52) U.S. Cl. .......................................... 705/10; 705/35
(58) Field of Classification Search ................ 705/10, 705/20, 38, 35
See application file for complete search history.

(56) References Cited

U.S. PATENT DOCUMENTS

| | | | | |
|---|---|---|---|---|
| 5,414,621 A | * | 5/1995 | Hough | 705/10 |
| 5,664,115 A | | 9/1997 | Fraser | |
| 5,680,305 A | | 10/1997 | Apgar, IV | 364/401 |
| 5,699,527 A | | 12/1997 | Davidson | 395/238 |
| 5,754,850 A | | 5/1998 | Janssen | |
| 5,802,501 A | | 9/1998 | Graff | 705/36 |
| 5,857,174 A | | 1/1999 | Dugan | 705/1 |
| 5,892,900 A | | 4/1999 | Ginter et al. | |
| 5,970,475 A | | 10/1999 | Barnes et al. | |
| 6,023,687 A | | 2/2000 | Weatherly et al. | |
| 6,049,784 A | | 4/2000 | Weatherly et al. | |
| 6,115,694 A | * | 9/2000 | Cheetham et al. | 705/10 |
| 6,321,202 B1 | | 11/2001 | Raveis, Jr. | |
| 6,351,738 B1 | | 2/2002 | Clark | |
| 6,785,661 B1 | | 8/2004 | Mandler et al. | |
| 2001/0005829 A1 | | 6/2001 | Raveis, Jr. | |

(Continued)

FOREIGN PATENT DOCUMENTS

EP 1220125 A2 * 7/2002

OTHER PUBLICATIONS

Hanrahan, Michael J.; "Future lies in Investment Analysis. Property Management Programs", National Real Estate Investor v35n1 pp. 69-69, Jan. 1993.*

(Continued)

*Primary Examiner*—Jagdish N Patel
(74) *Attorney, Agent, or Firm*—King & Spalding LLP

(57) ABSTRACT

The present invention relates to providing on-line tools for property-related on-line calculations. A distributed computer network can enable a user to access multiple databases and to obtain comparables data related to a property of interest for use in calculations. A user can access the latest, broadest set of relevant property data and to select relevant comparable values quickly and with minimal manual intervention. An on-line property management environment can comprise a distributed computer network coupled to numerous client computers, a property services server platform connected to a local data base, and numerous property information databases. A valuation tool, lease improvement calculator, refinancing calculator, capitalization rate calculator, mortgage and amortization calculator, and an affordability calculator can enable a user to make multiple property-related on-line calculations.

18 Claims, 55 Drawing Sheets

U.S. PATENT DOCUMENTS

| | | | |
|---|---|---|---|
| 2001/0034607 A1 | 10/2001 | Perschbacher, III et al. | |
| 2001/0037273 A1* | 11/2001 | Greenlee, Jr. | 705/35 |
| 2001/0039506 A1* | 11/2001 | Robbins | 705/10 |
| 2001/0047282 A1 | 11/2001 | Raveis, Jr. | |
| 2001/0051960 A1 | 12/2001 | Kubick et al. | |
| 2002/0004737 A1* | 1/2002 | McVeigh | 705/10 |
| 2002/0035535 A1 | 3/2002 | Brock, Sr. | |
| 2002/0046159 A1 | 4/2002 | Raveis, Jr. | |
| 2002/0052814 A1 | 5/2002 | Ketterer | |
| 2002/0062218 A1 | 5/2002 | Pianin | |
| 2002/0062277 A1 | 5/2002 | Foster et al. | |

OTHER PUBLICATIONS

"Real Estate News and Advice", *Realty Times* (online). Apr. 7, 2000. Retrieved from the internet: <URL http://web.archive.org/web/20000407223740/http://realtytimes.com>.

"Real Estate Center Online News", *Real Estate Center* (online). Aug. 11, 2000. Retrieved from the internet: <URL http://web.archive.org/web/20000815095134/recenter.tamu.edu/news/recon.html>.

PropertyFirst—Home Page- www.propertyfirst.com/main.asp—May 9, 2001.

PropertyFirst—Search for Sale—www.propertyfirst.com/search/page1.asp?imgtype=forsale—May 9, 2001.

PropertyFirst—Search for Lease—www.pfcweb02.propertyfirst.com/wfl1/new_search_step1.asp—May 9, 2001.

PropertyFirst—Commercial Real Estate Broker Search—www.propertyfirst.com/directory/directory.asp?imgtype=directory&membertype=2—May 9, 2001.

PropertyFirst—About Us—www.propertyfirst.com/aboutus/aboutus.asp—May 9, 2001.

PropertyFirst—Logon Page—www.propertyfirst.com/logon/asp?imgtype=addlisting&FromLocation=addlisting—May 9, 2001.

Storetrax—Home Page—www.storetrax.com/stx/autologin.do—May 9, 2001.

Stoetrax—About Us—About Storetrax—www.storetrax.com/stx/aboutus.jsp—May 9, 2001.

Storetrax—Find Space—www.storetrax.com/stx/startquicksearch.do—May 9, 2001.

Storetrax—List Space—www.storetrax.com/stx/listspace.jsp—May 9, 2001.

Storetrax—Forum—Forum List—www.storetrax.com/forum—May 9, 2001.

* cited by examiner

| Line Item | % | $ | $ per SF/Unit | Growth |
|---|---|---|---|---|
| Potential Gross Income | | $4,075,000.00 | $185.23 | 0.00% |
| Less Vacancy and Credit Loss | 5.00% | $203,750.00 | $9.26 | 0.00% |
| Effective Gross Income | | $3,871,250.00 | $175.97 | |
| Operating Expenses | | $1,650,000.00 | $75.00 | |
| Net Operating Income | | $2,221,250.00 | $100.97 | |

5d05 — Potential Gross Income
5d10 — Less Vacancy and Credit Loss
5d15 — Effective Gross Income
5d20 — Operating Expenses
5d25 — Net Operating Income 15d00

FIG. 15e step 3 for a property valuation

In this step, enter any capital expenses such as a leasing commission, tenant improvements, or capital reserves. Click on "save" to save your work.

1 property details    2 operating data    3 capital expenses    mortgage    5 investment    valuation outputs enter capital expenses We can estimate tenant improvements and leasing commissions using one of three methods:

○ Quick    ○ Basic    ○ Detail

* indicates a required field

|  | $ | $ per SF/Unit |

15e05 — Tenant Improvements
Average Tenant Improvements per Year: $600,000.00    $27.27

15e10 — Leasing Commissions
Average Leasing Commissions per Year: $150,000.00    $6.82

15e15 — Capital Reserves
Average Capital Reserves per Year: $50,000.00    $2.27 back    save    continue

FIG. 15h
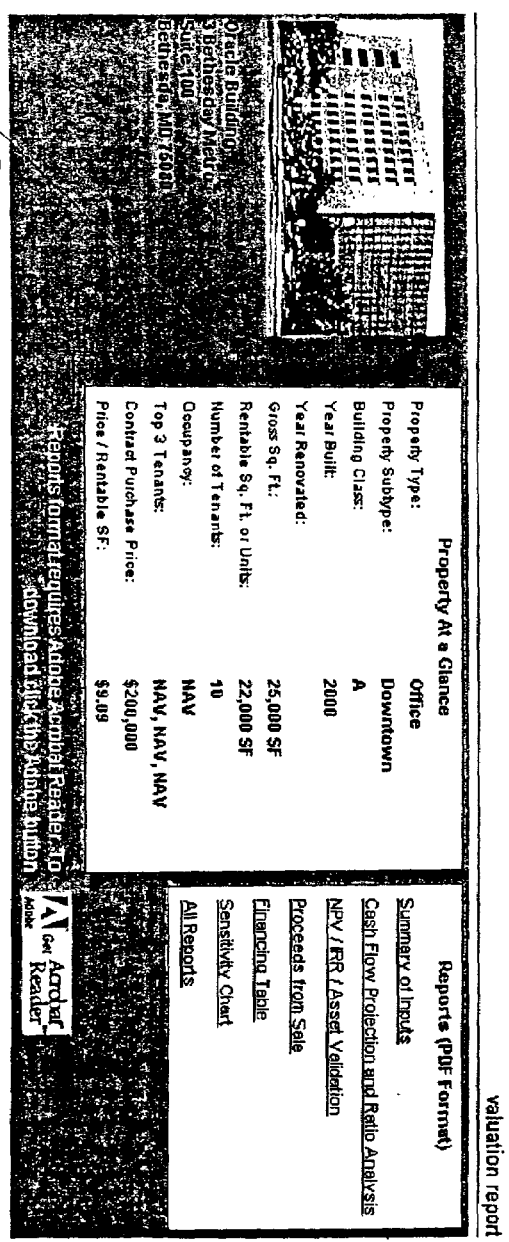

FIG. 15h
(cont.)

Customer Inputs

| | | $$ | $/sf |
|---|---|---|---|
| 1 | Effective Gross Income (Yr1) | $3,871,250 | $175.97 |
| 2 | Operating Expenses (Yr1) | $1,050,000 | $75.00 |
| 3 | Capital Expenditure (Yr1) | $600,000 | $38.36 |
| 4 | Net cash Flow Before debt Service | $1,421,250 | $64.60 |
| 5 | Discount Rate | 0.00% | |
| 6 | Terminal Cap Rate | | |
| 7 | Direct Cap Rate | 710.525% | |
| 8 | Purchase Price | $200,000 | $0.00 |
| 9 | Terminal Value | $300,000 | $13.64 |
| 10 | Loan to Value | | |
| 11 | Sales per Unit (Apartments - only) | | |
| 12 | Gross Rent Multiplier (Apartments - only) | | |
| | Present Value of R.E. Assets: | $2,367,857 | $107.63 |
| | Net Operating Income (NOI) | $1,605,952 | |

| | $$ per Square Foot | IRR | Realworkspace Benchmark From ($/sf) | To ($/sf) |
|---|---|---|---|---|
| Net Cash Flow before Debt Service | $73.00 | 633.15217% | $0.73 | $5.31 |
| Net Cash Flow after Debt Service | $107.63 | 633.15247% | $5.08 | $9.25 |
| | | | $38.36 | $36.30 |
| | | | ($31.71) | ($40.30) |

Performance Ratio Summary

| | NPV | Year 1 | Average | Realworkspace Benchmark From ($/sf) | To ($/sf) |
|---|---|---|---|---|---|
| | | | | (Year) | (Year) |
| NOI / Purchase Price | $1,375,952 | 0.0570 | 0.0570 | 0.4448 | -0.3709 |
| Cash Flow after ADS / Total Equity | | 0.1793 | 0.1793 | -3.0935 | -3.8551 |
| Levered Cash on Cash return | $1,375,952 | $107.63 | $33.15247% | $15.90 | $7.72 |
| NOI / ADS | | Infinite | NaN | Infinite | Infinite |
| Debt Service Coverage ratio | | Infinite | NaN | Infinite | Infinite |
| Loan Amount / Property Value | | 0 | 0 | 0 | 0 |
| Loan to Value | | 0.4049 | 0.4049 | 0.5221 | 0.7539 |
| Operating Expense / Potential Gross Income | | | | | |

FIG. 16a

The Leasehold Improvement Payback Calculator calculates the payback and breakeven points when you make capital improvements to a property. Start by filling in the information below, then click "calculate". If you have questions about this tool, click on the "explanation" tab above.

leasehold improvement payback calculator

- 16a05 — What is the square footage for this lease? 10,000 SF
- 16a10 — What is the average annual base rental rate? Per Square Foot — $100.00
- 16a15 — What is the lease term? 10 Years 0 Months
- 16a20 — What is the building standard improvements amount per square foot? $10.00
- 16a25 — What is the annual interest rate for financing the building standard improvements? 10%
- 16a30 — Are there above standard improvements? ⦿ Yes ○ No
- 16a35 — What is the above standard improvements amount per square foot? $15.00
- 16a40 — What is the annual interest rate for financing the above standard improvements? 5%
- 16a45 — What is the annual interest rate you are charging the tenant for above standard improvements? 6%

| | Standard Improvements | | Above Standard Improvements | | Total | |
|---|---|---|---|---|---|---|
| | Lease Term | Annual Per SF | Lease Term | Annual Per SF | Lease Term | Annual Per SF |
| Rent | $10,000,000.00 | $100.00 | $199,836.90 | $2.00 | $10,199,836.90 | $102.00 |
| Cost of Improvements | $100,000.00 | $1.00 | $150,000.00 | $1.50 | $250,000.00 | $2.50 |
| Financing Cost | $58,580.88 | $0.59 | $40,917.93 | $0.41 | $99,498.81 | $0.99 |
| Income from Lease | $9,841,419.12 | $98.41 | $8,918.98 | $0.09 | $9,850,338.09 | $98.50 |
| PV of Income from Lease | $6,205,930.28 | $62.06 | $7,007.44 | $0.07 | $6,212,937.72 | $62.13 | clear  calculate

The Refinance / Breakeven Calculator helps you calculate refinance loan savings and breakeven points to determine whether it is worth refinancing in today's market conditions. After you've entered information about your existing loan, continue by entering information about a new loan into the fields below. Click "calculate" to display the new payment amount. When you're ready, click on the "results" tab above to display the breakeven point and cumulative savings. To return to the calculation for a current loan, click the "current loan" tab. If you have questions about this tool, click on the "explanation" tab.

- 17b05 — What type of mortgage are you considering? Fixed Rate
- 17b10 — What type of amortization should we use? Full Amortization
- 17b15 — Current loan balance: $100,000.00
- 17b20 — Additional loan amount: $100,000.00
- 17b25 — What points and fees as a % are financed? 5%
- 17b30 — What fees as an amount are financed? $0.00
- 17b35 — Total new loan amount: $205,000.00
- 17b40 — What is the annual interest rate? 7%
- 17b45 — What is the new loan term? 30 Years
- 17b50 — What is the new payment frequency? Monthly
- 17b55 — Payment: $1,363.86
- 17b60 — What points and fees as a % are not financed? 0%
- 17b65 — What fees as an amount are not financed? $0.00
- 17b70 — Do you want to calculate a payoff amount? Yes No
- 17b75 — How many years do you plan to own the property? 10
- 17b80 — Payoff amount: $175,916.02 refinance / breakeven calculator

17b00 clear  calculate

Here are the results of your Refinance / Breakeven calculation. To see the results in a graphic format, click on the "graph" tab.

refinance / breakeven calculator

Based on the loan term:

| Compare | Current Loan | New Loan | Savings/ (Costs) | Present Value |
|---|---|---|---|---|
| Loan amount: | $100,000.00 | $205,000.00 | -- | -- |
| Total Payment | $216,000.00 | $490,989.60 | ($274,989.60) | ($82,450.24) |
| Points and Fees Unfinanced. | $2,000.00 | $0.00 | $2,000.00 | $2,000.00 |
| Total Savings: | | | ($276,989.60) | ($84,450.24) |
| Rate: | 10% | 7% | | |
| Term: | 216 Months (18Years) | 360 Months (30Years) | | |
| Payment | $1,000.00 | $1,363.86 | ($363.86) | |

Total Points and Fees Financed: $10,000.00  Breakeven -27.48 Payments
Total Points and Fees Unfinanced: $2,000.00  -5.5 Payments

* The calculated remaining term is used in the comparison analysis.

Based on the payoff term:

| Compare | Current Loan | New Loan | Savings/ (Costs) | Present Value |
|---|---|---|---|---|
| Loan amount: | $100,000.00 | $205,000.00 | -- | -- |
| Total Payment | $120,000.00 | $163,663.20 | ($43,663.20) | ($82,450.24) |
| Points and Fees Unfinanced: | $2,000.00 | $0.00 | $2,000.00 | $2,000.00 |
| Total Savings: | | | ($45,663.20) | ($84,450.24) |
| Rate: | 10% | 7% | | |
| Term: | 120 Months (10Years) | 120 Months (10Years) | | |
| Payment | $1,000.00 | $1,363.86 | ($363.86) | |

What type of amortization should we use?

This calculator provides the option to consider three types of loan amortization

- Full Amortization: loan payments will pay the loan balance in full at the end of the payment term.

- Balloon: loan balance will decrease based on the payment; however, the payment will not pay the loan balance in full at the end of the loan term. The payment you enter will consist of principal and interest. The calculator will determine the interest portion of the payment based on your input of payment term and the interest rate. A balloon term's payment is calculated as if the loan were to amortize over a longer time period then the length of the loan. The remaining principal is paid off when the balloon matures. For example, the payment is calculated to pay off in 30 years, but the loan is due in 5 years. In a Balloon loan with the balloon payment defined as percent of loan, the paym is calculated based on the percentage of the loan balance that is due at maturity. In a Balloon loan with the balloon payment defined as specified amount, the payment is calculated based on the remaining loan balance that is due at maturity

- Interest Only. The loan balance will not decrease based on the loan payment. The payment pays o the interest due on the loan. At the end of the loan term, the full loan principle amount will be due.

17e10

Do you want to calculate a payoff amount?

Enter a payment value, and the calculator will determine the value of the payoff amount.

17e35 — How many periods between adjustments?
Enter the number of periods between adjustments. If the payment frequency is quarterly and the rate adjusts every 2 years, you would enter 8.

17e40 — Do you want to use the maximum rate adjustments? (worst-case scenario)
Because of the inability to predict interest rates, this calculator allows you to simulate the maximum rate change for each adjustment date without exceeding the maximum rate allowed for the loan. Deselecting the checkmark displays additional fields for entering assumptions about future interest rate changes.

17e45 — What is the minimum rate?
The minimum rate is sometimes referred to as the floor. Enter the lowest interest rate that could apply.

17e50 — What is the initial index value?
Enter the initial rate of the index. Variable rate loans generally base the interest rate on an index like the prime rate of a major bank, for example.

17e55 — What is the margin?
The margin is the amount that is added to the index to establish the interest rate on each adjustment date. Variable rate loans generally include a margin or some other percentage above the index value.

17e60 — What do you predict will be the index change per adjustment?
Enter the percent change that you predict will occur in the index in for the rate. You may enter a negative or a positive change. The calculator will increase the interest rate by this amount for each of the adjustment dates until the rate reaches the maximum or minimum interest rate allowed on the loan.

17e65 — Break Even is the point at which the cost of obtaining the new loan has be paid back by the decrease, if any, in the payments. In other words, the number of payments it takes to cover the points and fees you paid to refinance the mortgage.

17e70 — Savings/(Cost) is the amount of cash you will pay(cost) or save(savings) based on a comparison between the total payments remaining on the current loan to the total payments on the new loan.

17e75 — Present value tells you what the future payments are worth as cash today.

File  Edit  View  Favorites  »  Address  Go

19e10

19e15

What type of amortization should we use?

This calculator provides the option to consider three types of loan amortization

- Full Amortization: loan payments will pay the loan balance in full at the end of the payment term.

- Balloon: loan balance will decrease based on the payment; however, the payment will not pay the loan balance in full at the end of the loan term. The payment you enter will consist of principal and interest. The calculator will determine the interest portion of the payment based on your input of payment term and the interest rate. A balloon term's payment is calculated as if the loan were to amortize over a longer time period then the length of the loan. The remaining principal is paid off when the balloon matures. For example, the payment is calculated to pay off in 30 years, but the loan is due in 5 years. In a Balloon loan with the balloon payment defined as percent of loan, the payment is calculated based on the percentage of the loan balance that is due at maturity. In a Balloon loan with the balloon payment defined as specified amount, the payment is calculated based on the remaining loan balance that is due at maturity.

- Interest Only: The loan balance will not decrease based on the loan payment. The payment pays only the interest due on the loan. At the end of the loan term, the full loan principle amount will be due.

Do you want to calculate a payoff amount?

Enter a payment value, and the calculator will determine the value of the payoff amount

19e35 — How many periods between adjustments?
Enter the number of periods between adjustments. If the payment frequency is quarterly and the rate adjusts every 2 years, you would enter 8.

19e40 — Do you want to use the maximum rate adjustments? (worst-case scenario)
Because of the inability to predict interest rates, this calculator allows you to simulate the maximum rate change for each adjustment date without exceeding the maximum rate allowed for the loan. Deselecting the checkmark displays additional fields for entering assumptions about future interest rate changes.

19e45 — What is the minimum rate?
The minimum rate is sometimes referred to as the floor. Enter the lowest interest rate that could apply.

19e50 — What is the initial index value?
Enter the initial rate of the index. Variable rate loans generally base the interest rate on an index like the prime rate of a major bank, for example.

FIG. 19e (cont.)

What is the minimum rate?

The minimum rate is sometimes referred to as the floor. Enter the lowest interest rate that could apply.

What is the initial index value?

Enter the initial rate of the index. Variable rate loans generally base the interest rate on an index like the prime rate of a major bank, for example.

What is the margin?

The margin is the amount that is added to the index to establish the interest rate on each adjustment date. Variable rate loans generally include a margin or some other percentage above the index value.

What do you predict will be the index change per adjustment?

Enter the percent change that you predict will occur in the index in for the rate. You may enter a negative or a positive change. The calculator will increase the interest rate by this amount for each of the adjustment dates until the rate reaches the maximum or minimum interest rate allowed on the loan.

This Affordability Calculator will help you determine the size of the commercial real estate loan you can afford by calculating the loan amount based on Net Operating Income (NOI) and basic underwriting criteria. Start by selecting the property type you are interested in below. Next, enter your information into the appropriate fields, then click "calculate" for the results. If you have questions about this tool, click on the "explanation" tab.

affordability calculator

Calculation

Enter one of the inputs below, and the remaining fields will be calculated based on the assumptions.

| | | |
|---|---|---|
| 20a05 | Property Type | Office |
| 20a10 | Annual Net Operating Income | $4,634.63 |
| 20a15 | Annual Debt Service | $3,862.19 |
| 20a20 | Loan Amount | $40,000.00 |
| 20a25 | Property Value Required | $50,000.00 |
| 20a30 | Capitalization Rate (NOI/Property Value) | 9.26925% | clear   calculate

Assumptions

| | | |
|---|---|---|
| 20a35 | Debt Service Coverage | 1.2 |
| 20a40 | Payment Frequency | Monthly |
| 20a45 | Loan Term | 30 Years |
| 20a50 | Interest Rate | 9% |
| 20a55 | Loan-to-Value Ratio | 80% |

Click here for current market rates and ratios clear

Copyright © 2000 by Realworkspace, LLC. All rights reserved

To determine your office space needs, enter the number of offices, cubicles, meeting rooms and common areas in the fields below. You can plan for future growth as well - simply list the number of years you plan to occupy this space. If you have questions about this tool, click on the "explanation" tab.

space calculator

Do you want to include Offices in your estimate?  ⊙ Yes  ○ No  —— 21a05

Offices — Fill in the total number of Offices required.

| Description | | Length (feet) | x | Width (feet) | = | Total S.F. | | |
|---|---|---|---|---|---|---|---|---|
| CEO | | 20 ft | x | 15 ft | = | 300 sqft | 0 | Total Units |
| Partner | | 15 ft | x | 15 ft | = | 225 sqft | 0 | Total Units |
| Director | | 10 ft | x | 15 ft | = | 150 sqft | 0 | Total Units |
| Manager | | 10 ft | x | 12 ft | = | 120 sqft | 0 | Total Units |

Do you want to include Cubicles in your estimate?  ⊙ Yes  ○ No  —— 21a10

Cubicles — Fill in the total number of Cubicles required.

| Description | | Length (feet) | x | Width (feet) | = | Total S.F. | | |
|---|---|---|---|---|---|---|---|---|
| Supervisor | | 10 ft | x | 10 ft | = | 100 sqft | 0 | Total Units |
| Large Cube | | 8 ft | x | 8 ft | = | 64 sqft | 0 | Total Units |
| Medium Cube | | 6 ft | x | 8 ft | = | 48 sqft | 0 | Total Units |
| Small Cube | | 5 ft | x | 5 ft | = | 25 sqft | 0 | Total Units |

FIG. 21a (cont.)

| Description | | Length (feet) | x Width (feet) | = Total S.F. | Capacity | | |
|---|---|---|---|---|---|---|---|
| Do you want to include Conference Rooms in your estimate? ⊙ Yes ○ No —21a15 | | | | | | | |
| Conference Rooms | | | | Fill in the total number of Conference Rooms required. | | | |
| Board Room | | 25 ft | x 15 ft | = 375 sqft | 12 | 0 | Total Units |
| Large Conference Room | | 20 ft | x 20 ft | = 400 sqft | 10 | 0 | Total Units |
| Small Conference Room | | 20 ft | x 15 ft | = 300 sqft | 8 | 0 | Total Units |
| Small Meeting Room | | 15 ft | x 15 ft | = 225 sqft | 4 | 0 | Total Units |
| Do you want to include Support Common Areas in your estimate? ⊙ Yes ○ No —21a20 | | | | | | | |
| Support Common Areas | | | | Fill in the total number of Support Common Areas required. | | | |
| Large Reception Area | | 25 ft | x 20 ft | = 500 sqft | | 0 | Total Units |
| Small Reception Area | | 20 ft | x 15 ft | = 300 sqft | | 0 | Total Units |
| Print/Copy Room | | 10 ft | x 15 ft | = 150 sqft | | 0 | Total Units |
| Break Room | | 20 ft | x 15 ft | = 300 sqft | | 0 | Total Units |
| Library/File Storage | | 25 ft | x 15 ft | = 375 sqft | | 0 | Total Units |
| Equipment Room | | 10 ft | x 15 ft | = 150 sqft | | 0 | Total Units |
| Training Room | | 20 ft | x 20 ft | = 400 sqft | 10 | 0 | Total Units |
| Mail Room | | 20 ft | x 15 ft | = 300 sqft | | 0 | Total Units |

Here are the results of your space planning calculation. For a graphic view, click on "graph" above. If you have questions about this tool, click on the "explanation" tab.

space calculator

| Quantity | Space Description | Sq. Ft per Unit | Total Space | |
|---|---|---|---|---|
| Offices | | | | |
| 10 | CEO | 300 sqft | 3,000 sqft | |
| 0 | Partner | 225 sqft | 0 sqft | |
| 0 | Director | 150 sqft | 0 sqft | |
| 0 | Manager | 120 sqft | 0 sqft | |
| | Subtotal | | 3,000 sqft | —21c05 |
| Cubicles | | | | |
| 0 | Supervisor | 100 sqft | 0 sqft | |
| 10 | Large Cube | 64 sqft | 640 sqft | |
| 0 | Medium Cube | 48 sqft | 0 sqft | |
| 0 | Small Cube | 25 sqft | 0 sqft | |
| | Subtotal | | 640 sqft | —21c10 |
| Conference Rooms | | | | |
| 10 | Board Room | 375 sqft | 3,750 sqft | |
| 0 | Large Conference Room | 400 sqft | 0 sqft | |
| 0 | Small Conference Room | 300 sqft | 0 sqft | |
| 0 | Small Meeting Room | 225 sqft | 0 sqft | |
| | Subtotal | | 3,750 sqft | —21c15 |
| Support Common Areas | | | | |
| 10 | Large Reception Area | 500 sqft | 5,000 sqft | |
| 0 | Small Reception Area | 300 sqft | 0 sqft | |
| 0 | Print/Copy Room | 150 sqft | 0 sqft | |
| 0 | Break Room | 300 sqft | 0 sqft | |
| 0 | Library/File Storage | 375 sqft | 0 sqft | |
| 0 | Equipment Room | 150 sqft | 0 sqft | |
| 0 | Training Room | 400 sqft | 0 sqft | |
| 0 | Mail Room | 300 sqft | 0 sqft | |
| | Subtotal | | 5,000 sqft | —21c20 |

| | | | |
|---|---|---|---|
| Subtotal for All Areas | | 12,390 sqft | |
| Circulation Area | 30% | 3,717 sqft | |
| Total Usable Square Feet | | 16,107 sqft | —21c25 |
| Add-On Factor | 15% | 2,416 sqft | |
| Total Rentable Square Feet | | 18,523 sqft | |
| Total Space Required over Lease Term | | 18,523 sqft | |

METHOD AND SYSTEM FOR PROPERTY VALUATION IN AN ON-LINE COMPUTING ENVIRONMENT

PRIORITY CLAIM AND RELATED APPLICATION

Applicants claim priority under 35 USC §119(e) to U.S. Provisional Application Ser. No. 60/249,985 filed Nov. 20, 2000, entitled "Property Valuation in an On-Line Computing Environment", the disclosure of which is fully incorporated herein by reference.

FIELD OF THE INVENTION

The present invention is generally directed to valuation of assets and, more particularly, to valuing real property, including land and buildings, using the information and communication resources of an on-line computing environment, such as the global Internet.

BACKGROUND OF THE INVENTION

Prior attempts to create a valuation tool in the property management field have focused upon a custom-built spreadsheet model or a computer software program designed for operation on a user's desktop computer, such as the "ARGUS" commercial real estate valuation program. The constraint in using these prior—implemented property valuation solutions is that they are stand-alone computing models that fail to harness the distributed computing power of remote information sources and efficient communications offered by the global Internet.

This constraint upon prior valuation software solutions requires users to analyze comparables supporting valuation analysis in a suboptimal way. For example, a user typically completes a time-consuming process of compiling property comparables from multiple sources, analyzing their relevancy, using them as a guide to the model inputs and manually entering the best estimate. Large financial institutions typically employ teams of analysts who gather property comparables data and store them in proprietary databases for use in desktop computing-based valuation models.

The property valuation models in the prior art suffer from the disadvantage of being disconnected from the property-related data that drive the valuation calculations. In view of the foregoing, there is a need in the property valuation art to connect the valuation model(s) and property valuation data, such as property comparables, via an efficient computing structure of a distributed computing network. There is a further need in the property valuation art to efficiently access relevant property information while minimizing the possibility for valuation errors to create an accurate property valuation.

SUMMARY OF THE INVENTION

The present invention solves the above problems by providing on-line tools for calculating values related to property. The distributed computer network can enable a user to access multiple databases and to obtain comparables data related to a property of interest for use in calculations. This can enable users to access the latest, broadest set of relevant property data and to select relevant comparable values quickly and with minimal manual intervention. An on-line property management environment can comprise a distributed computer network, such as the global Internet, coupled to numerous client computers, a property services server platform connected to a local data base, and numerous property information databases. The client computers can represent typical users of property services hosted by the property services server platform. The client computers can also represent service providers for servicing the activities of users in the property management field. The property services server platform can provides real estate industry services, including content, decision support tools, transaction exchanges, and access to key members of the real estate community and its service providers.

Several tools can be provided in the exemplary embodiment of the present invention. A valuation tool can value a real estate asset by inputting information about the asset's actual and projected revenues and expenses. Payback calculation tools can include a lease improvement calculator, a refinancing calculator, and a capitalization rate calculator. A user can operate the lease improvement calculator to calculate how much of standard rent will go towards building standard improvements and how much profit is available from such standard improvements. The refinancing calculator can allow a user to calculate refinance loan savings and breakeven terms. The direct capitalization calculator can allow a user to calculate a capitalization rate. Cash flow calculation tools can include a mortgage and amortization calculator and an affordability calculator. A user can operate the mortgage and amortization calculator to calculate mortgage payments on a fixed or a variable commercial loan and to calculate principal and interest payments over the term of a fixed loan. The affordability calculator can allow a user to calculate the loan amount based on net operating income (NOI) and basic underwriting criteria. A space calculator can complete tenant space planning calculations, including calculations for determining the amount of office space required by a tenant.

BRIEF DESCRIPTION OF THE DRAWINGS

FIG. 11 is a representative display screen illustrating a "personalizable" workspace for real estate operations hosted by a property services server platform in accordance with an exemplary embodiment of the present invention.

FIGS. 15a–15h, collectively described as FIG. 15, are representative display screens for initiating a valuation for a selected property in accordance with an exemplary embodiment of the present invention.

FIGS. 16a–16c, collectively described as FIG. 16, are representative display screens illustrating a tool for calculating how much of a standard rent can be allocated to building standard improvements and to profits made on those standard improvements in accordance with an alternative exemplary embodiment of the present invention.

FIGS. 17a–17e, collectively described as FIG. 17, are representative display screens illustrating the a variety of refinancing calculations in accordance with an alternative exemplary embodiment of the present invention.

FIGS. 18a–18b, collectively described as FIG. 18, are representative display screens illustrating a tool for calculating a capitalization rate for a selected property in accordance with an alternative exemplary embodiment of the present invention.

FIGS. 19a–19e, collectively described as FIG. 19, are representative display screens illustrating the calculation of an amortization schedule for a mortgage in accordance with an alternative exemplary embodiment of the present invention.

FIGS. 20a–20b, collectively described as FIG. 20, are representative display screens illustrating the calculation of a loan amount that a property can support based upon net operating income and basic underwriting assumptions in accordance with an alternative exemplary embodiment of the present invention.

FIGS. 21a–21e, collectively described as FIG. 21, are representative display screens illustrating space calculations in accordance with an alternative exemplary embodiment of the present invention.

DETAILED DESCRIPTION OF THE EXEMPLARY EMBODIMENTS

Figure 1:
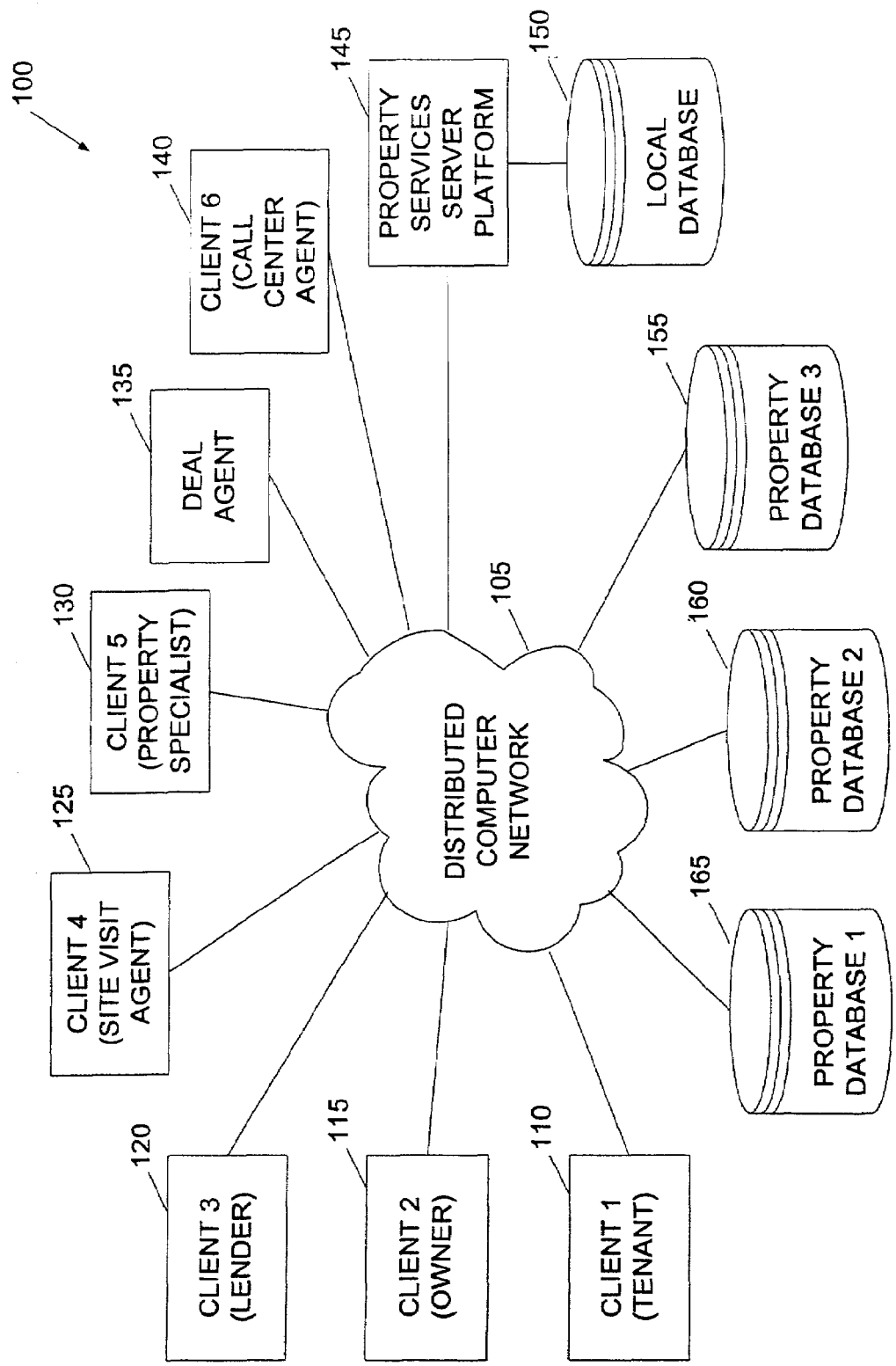
FIG. 1 is a block diagram illustrating a representative-operating environment for an exemplary embodiment of the present invention.

The present invention is directed to an on-line valuation tool for calculating the valuation of an asset, such as real property. The present invention combines an on-line valuation model for valuing real property, based on a discounted cash flow methodology, with comparables information typically accessed from multiple sources via a distributed computing network. The distributed computer network enables a user to access multiple databases and to obtain comparables data related to a property of interest for use in calculations completed by the valuation model. This enables users to access the latest, broadest set of relevant property data and to select relevant comparable values quickly and with minimal manual intervention for use in the valuation model to realize a current and accurate property valuation.

The user can use a browser coupled to the Internet to access the valuation modeling application, which is preferably maintained at a remote server as part of an Application Service Program (ASP) model. As the user enters the inputs to the valuation model, she is prompted by comparables aimed to assist her in calculating an accurate valuation of a property-in-interest. These comparables are drawn from relevant data sources available on the distributed computing network and/or from local storage accessible by the server, to enable the user to efficiently access current property information from a variety of possible sources. The comparables can be sorted based on the closest match to the characteristics of the asset being valued, typically real property, such as an office building. In the case of commercial real estate, a property type can represent the closest match, such as a sub-market pair, e.g., Bethesda: Office. If no exact match exists, the next best available can be used to provide a possibly relevant comparable for consideration by the user.

Once the user completes the inputs and calculates a value for the real property of interest, an exemplary embodiment of the present invention can present comparables against the calculated valuation outputs of the valuation model. This enables the user to either revise the inputs based on this view of the information or to assess the relative value of the asset.

Further, the user can send an electronic "package" of valuation information to third parties, such as lenders, via the distributed computing network for underwriting purposes. This enables the third parties to use the valuation data in an easily manipulated electronic format to quickly identify the main areas upon which to focus their due diligence.

The remote server also can support a Portal operation by providing a central Web site for a consumer's real estate-related operations. This remote server can offer conventional Web-based services targeted to real estate consumers via this portal model. By aggregating a variety of real estate-related tools and services at a single Web site, the Portal offers consumers the opportunity to conveniently complete due diligence activities for a real estate transaction, to analyze market aspects of the transaction, to finance the transaction and to access service providers in support of the transaction. Advantageously, the Portal operated by this server platform also enable a user to create a "personalizable" workspace for her real estate-related transactions. The Portal can further provide a central location in an on-line computing environment for reviewing a consumer's real estate activities, and collecting current real estate news/research and relevant property and stock market information. In view of the foregoing, it will be understood that the remote server can support both an ASP model and a Portal Web site for servicing the needs of real estate consumers.

On-Line Real Estate Services Environment

Turning now to the Figures, in which like reference numbers are assigned to like elements, FIG. 1 is a block diagram illustrating the primary components of a representative operating environment for an exemplary embodiment of the present invention. An on-line property management environment 100 comprises a distributed computer network 105, such as the global Internet, coupled to numerous clients 110–140, a property services server platform 145 connected to a local data base 150, and numerous property information databases 155–165. For the client-server computing environment shown in FIG. 1, the client computers 110–115 represent typical users of property services hosted by the property services server platform 145. The client computers 120–140 represent service providers for servicing the activities of users in the property management field. For example, typical consumers of the property services accessible at the property services server platform 145 via the distributor computer network 105 include property tenants and property owners, as shown at the client computers 110 and 115. Representative service providers in the property management field include lenders, site visit agents, engineering, appraisal and environmental specialists, deal agents, and call center agents, as shown in connection with client computers 120–140.

The property services server platform 145 provides real estate industry services, including content, decision support tools, transaction exchanges, and access to key members of the real estate community and its service providers. For example, the property services server platform 145 can provide users operating client computers with convenient access to budgeting, forecasting, and valuation tools in the real estate field. The property services server platform 145 also enables a user, such as a tenant at the client 110 or a property owner at the client 115, to communicate via electronic mail with a lender at the client 120; a site visit agent at the client 125; a property specialist operating at the client 130; a deal agent operating at the client 135; or a call center agent operating at the client 140. The property services server platform 145 also can publish information at one or more Web site pages to facilitate the matching of a user, such as a tenant or owner, to a lender, site visit agent service provider or deal agent. Although the matching of a user to a desired party can be facilitated by the on-line environment shown in FIG. 1, it will be appreciated that communications between these parties can be further accomplished by a variety of conventional means, including telephone, electronic mail messages, facsimile correspondence, mail delivery, etc.

The electronic communications framework of the on-line operating environment 100 enables a user, such as a tenant or owner, to efficiently identify and communicate with a variety of parties associated with the typical evaluation and closing of a real estate transaction. A lender, represented by the client 120, can work with a property owner or tenant to support financing requirements in connection with a real estate transaction. A site visit agent, represented by the client 125, can support a tenant's on-site review and analysis of a property under consideration. A property specialist, represented by the client 130, can provide property-related expertise, such as engineering, appraisal, or environmental services, to a user in connection with a real estate transaction. A deal agent, represented by the client 135, can assist a user by screening, negotiating, and closing real estate-related transactions on behalf of that user.

Site Visit Agent

A site visit agent, typically based in a location proximate to the property or space of interest, can support a purchase or lease decision by showing the property or space to the parties of a transaction, such as tenants, owners, and lenders. For example, a site visit agent can visit a building or space of interest with an owner or purchaser and offer her expertise about the visit site, including configuration alternatives, build-out costs, etc. In contrast to a real estate broker, who often juggles several real estate transaction tasks at once, a site visit agent is focused solely on showing properties on behalf of her customer. A user can select a site visit agent from information published at the property services server platform 145 or by requesting information from a call center agent. The user communicates with a selected site visit agent, represented by the client 125, via the on-line environment 100 or by other conventional means.

Property Specialist

The property services server platform 145 also provides a convenient on-line forum for connecting a variety of property specialists to the potential users of those services. For example, a tenant operating the client 110 can obtain information from the property services server platform 145 about the services offered by property specialists represented by the client 130, including appraisal, engineering, and environmental services. This information can include the identity of property specialists within a specified profession, such as engineering, appraisal or environmental services; contact information for property specialists in the selected field; and fee estimates for services provided by the listed property specialists. Consequently, the real property services service platform 145 provides a marketplace that enables a user to identify and to select a desired service provider within the framework of the on-line environment 100.

For example, a customer operating from a client site, such as a tenant client 110 or an owner client 115, can gain access to a service provider based upon the user's issuance of a request to the property services server platform 145. In turn, the property services server platform 145 can respond to this request by presenting information sufficient to facilitate a communication between the parties. For example, this communication link can be established by the server platform 145 via a hyperlink to a service provider's web site, electronic mail to a service provider, or publication of service provider contact information.

Deal Agent

A deal agent, represented by the client 135, can work on behalf of a user to support the completion of a property-related transaction, including leasing, financing, and buy-sell exchanges. The property services server platform 145 provides an on-line forum listing deal agents available to support a user's real estate transaction. In the absence of a relationship with another service provider, the user can rely upon the real estate expertise of a deal agent in evaluating and completing a property transaction. A user operating a client site, such as the client 110 or 115, can obtain the services of a deal agent by issuing a request to the property services server platform 145 or by contacting a customer service agent at the client 140. For example, the property services server platform 145 can establish communications between the user and a deal agent via selection of a hyperlink to a deal agent's web's site, electronic mail to a deal agent, or publication of contact information for a deal agent. The user also can contact a customer service agent based upon contact information published at the property services server platform 145.

Call Center Agent

A call center agent can handle a variety of contacts by customers of the property services, including requests for products and services; billing inquiries; Web-site assistance; and property services-related questions. A call center agent, typically located at a central call center site, can facilitate the scheduling of support by a site visit agent, a property specialist, or a deal agent, by responding to the schedules of the agent and the customer. In this manner, call center agents operating at the client 140 can provide basic customer service via electronic communications, such as e-mail, by telephone, or other conventional communication means.

It will be appreciated that the call center functions are preferably delegated to personnel with a variety of call center and real estate experiences. For example, customer service agents with limited real estate experience can provide basic customer services, whereas deal agents with more substantial real estate experience can support the detailed aspects of leasing, financing, and buy-sell deals. Call center agents and deal agents can be housed in a central location to provide support to a variety of geographically dispersed users connected to the distributed computer network 105 via client computers.

Communications between lenders, site visit agents, deal agents, property specialists, call center agents and the customer are supported by electronic communications carried by the distributed computer network 105 or other conventional communication means. Although only a single client computer is shown in FIG. 1 for each of the service functions, it will be appreciated that the on-line environment 100 can include multiple client computers supporting lending, site visit, property specialist, deal and call center services.

Local and Remote Databases

Although the property services server platform 145 can access content and related property data from a local database 150, it will be appreciated that the distributed nature of the computing environment shown in FIG. 1 also supports retrieval of such information from remote data sources, such as the property databases 155, 160 and 165. The distributed nature of the computer network 105 in the on-line environment 100 facilitates a user accessing information relevant to a real estate transaction in databases maintained at remote geographical sites. Significantly, users are no longer constrained from reaching a decision about a real estate transaction based only upon locally available information, such as the property information maintained at the user's desktop computer. The property services server platform 145 provides a central forum for a user's retrieval of real estate-related information from a variety of on-line services.

Property Services Server Platform

The property services server platform 145 can support an ASP model by delivering software applications or tools to users operating various clients, such as the tenant client 110, the owner client 115 or the lender client 120. This ASP model allows a client running a Web browser to connect via the distributed computer network 105 to the property services server platform 145 and to access a variety of real estate-related applications and to manipulate and store real estate data. Typical applications operated by the property services server platform 145 include budgeting, financing, forecasting, and valuation tools for the real estate industry.

The valuation tool allows the customer at a client-computing site to value a real estate asset by inputting information about the asset's actual and projected revenues and expenses. In addition, the user can access objective benchmark data, such as property comparables, maintained at the local database 150 or databases maintained by third parties, such as the property databases 155, 160 and 165. A user can use the valuation tool within the ASP model to assess the relative value of a building, to model alternative scenarios, and to address due diligence issues based upon a variety of assumptions. The output of the valuation process can be formatted in a standard electronic format for transmission to other clients coupled to the distributed computer network 105, such as the lender client 120, to facilitate a real estate transaction. The property valuation tools will be described in more detail in connection with FIGS. 3 and 15.

Other applications available at the ASP model hosted by the property services server platform 145 include payback calculation tools, cash flow calculation tools and space calculation tools. The payback calculation tools can include a lease improvement calculator, a refinancing calculator, and a direct capitalization calculator. A user can operate the lease improvement calculator to calculate how much of standard rent will go towards building standard improvements and how much profit is available from such standard improvements, as discussed in FIGS. 4 and 16. The refinancing calculator allows a user to calculate refinance loan savings and breakeven terms, as discussed in FIGS. 5 and 17. The direct capitalization calculator allows a user to calculate a capitalization rate, as discussed in FIGS. 6 and 18.

The cash flow calculation tools include a mortgage and amortization calculator and an affordability calculator. A user can operate the mortgage and amortization calculator to calculate mortgage payments on a fixed or a variable commercial loan and to calculate principal and interest payments over the term of a fixed loan, as discussed in FIGS. 7 and 19. The affordability calculator allows a user to calculate the loan amount based on net operating income (NOI) and basic underwriting criteria, as discussed in FIGS. 8 and 20.

Figure 9:
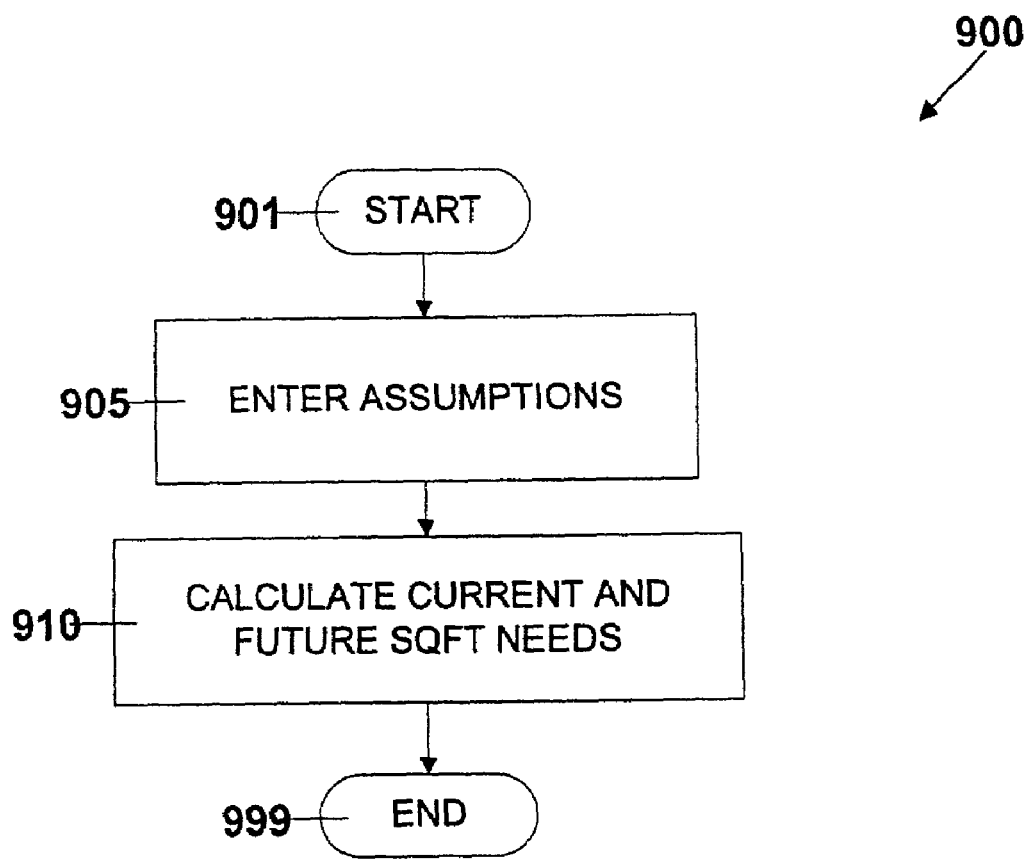

A user can operate the space calculator to complete tenant space planning calculations, including calculations for determining the amount of office space required by a tenant, as discussed in FIGS. 9 and 21.

The property services server platform 145 also operates as a Portal by providing a central Web site for a consumer's real estate-related operations. For Portal operations, the property services server platform 145 aggregates a variety of real estate-related tools and services at a single Web site accessible by consumers, service providers and agents via client computers. For example, the property services server platform 145 can offer consumers the opportunity to use a single Web site to conveniently complete due diligence activities for a real estate transaction, to analyze market aspects of the transaction, to finance the transaction and to access service providers in support of the transaction. A consumer operating a browser at a client site, such as the client 110 or 115, can create a "personalizable" workspace for her real estate-related transactions at the property services server platform 145. This server platform also provides a central location in an on-line computing environment for reviewing a consumer's real estate activities, current real estate news and research, and relevant property and stock market information. Typical portal operations include the personalizable workspace, described as "My Workspace," a variety of services, including research, financing, leasing, calculation tools, and access to real estate experts. Representative portal operations are illustrated in the display screens presented in FIGS. 10–14.

For example, the property services server platform 145 supports the delivery of a variety of services to a client via the distributed computer network 105, including research, financing, leasing, and other business services, as shown in the representative log-in display screen. A user operating from a client-computing site, such as the owner client 115, can research a specified property topic by requesting results from the property services server platform 145. The property services server platform 145 can respond to this research request by obtaining relevant research information from either the local database 150 or one or more of the property databases 155, 160 or 165. Typical research includes commercial real estate news, typically sorted by property-type, market, or company name, market indices, interest rates, stock prices, and market demographics.

For financing services, a property owner can use a client computer, such as the client 115, to request a financing quote from the property services server platform 145. In response to loan parameters specified by the owner, the property services server platform 145 can complete an on-line financing application and forward the completed application to one or more lenders at the client 120. The lender can process the electronic data set associated with the completed financing application and transmit a financing quote to the owner via the distributed computer network 105. For an exemplary embodiment, the completed financing application prepared by the property services server platform 145 can include in electronic format the loan request, property-related research, property valuation, and other information selected by the user.

The property services server platform 145 also can support the negotiation and execution of the real estate transaction in an on-line environment. For example, a tenant operating at the client 110 and a property owner operating at the client 115 can evaluate the parameters of a real estate transaction by using the tools and research available at the property services server platform 145. In an on-line exchange hosted by the property services server platform 145, the tenant at the client 110 can post a bid and, in response, the property owner at the client 115 can post a reply. A deal agent at the client 135 can work with the tenant at the client 115 via the distributed computer network 105 to support transaction negotiations. Upon completion of on-line negotiations, the transaction can be formalized by populating an on-line agreement with the negotiation terms. It will be appreciated that this on-line transaction environment operates to reduce the transaction costs associated with a conventional real estate transaction.

In view of the foregoing, it will be appreciated that the on-line environment 100 supports the effectiveness and efficiency of commercial real estate professionals in the execution of leasing, financing, and buy-sell transactions. This on-line environment 100 can fulfill the needs of its users by supporting efficient communication of information via a distributed computer network among a community comprising tenants, owners, lenders, site visit agents, property specialists, deal agents, cost center agents, and a variety of other service providers.

Figure 2:
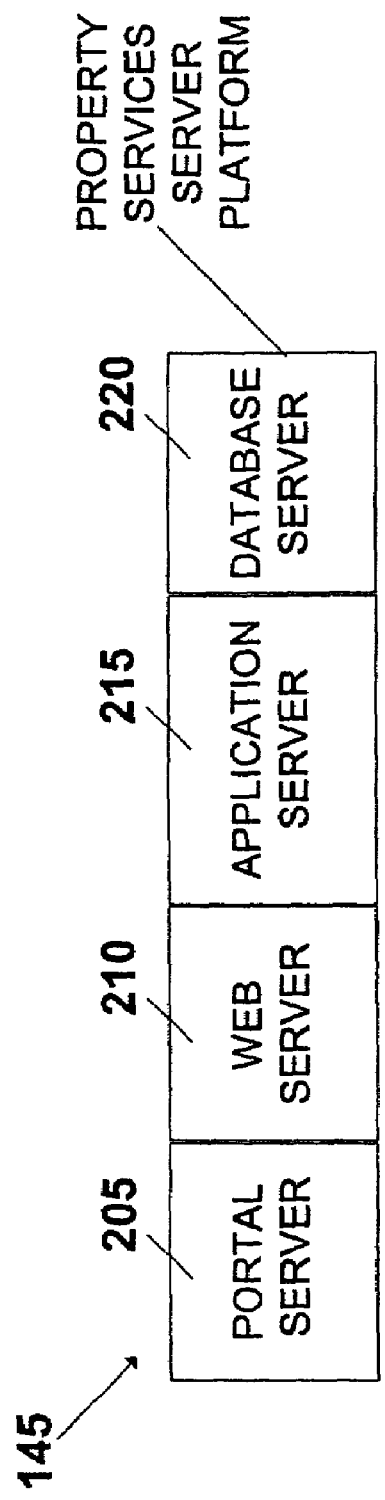
FIG. 2 is a block diagram illustrating the primary components of a real estate services server platform for an exemplary embodiment of the present invention.

FIG. 2 is a diagram illustrating the primary components of the property services server platform 145. Turning now to FIG. 2, the property services server platform 145 comprises a portal server 205, a Web server 210, an application server 215 and a database server 220. As indicated by their descriptive names, the servers 205–220 support portal, Web, application and database functions of property services server platform 145. For the exemplary embodiment, the operating environment is implemented by Sun Microsystem's "SOLARIS" operating system. An "Epicentric" server implements the portal server 205. An "iPlanet" server implements the Web server 210. A "WebLogic" server implements the application server 215, which supports the ASP model. The database server 220 is implemented by Oracle's "8I" server and corresponding database. Although not illustrated in FIG. 2, it will be understood that the property services server platform 145 is protected by conventional firewalls, being SSL security protocol, physical security, and includes emergency back-up capabilities.

On-Line Property Valuation and Calculation Processes

The processes for valuing a property, calculating a payback/breakeven amount, calculating cash flow, and calculating space requirements are set forth below.

Valuation Process

Figure 3:
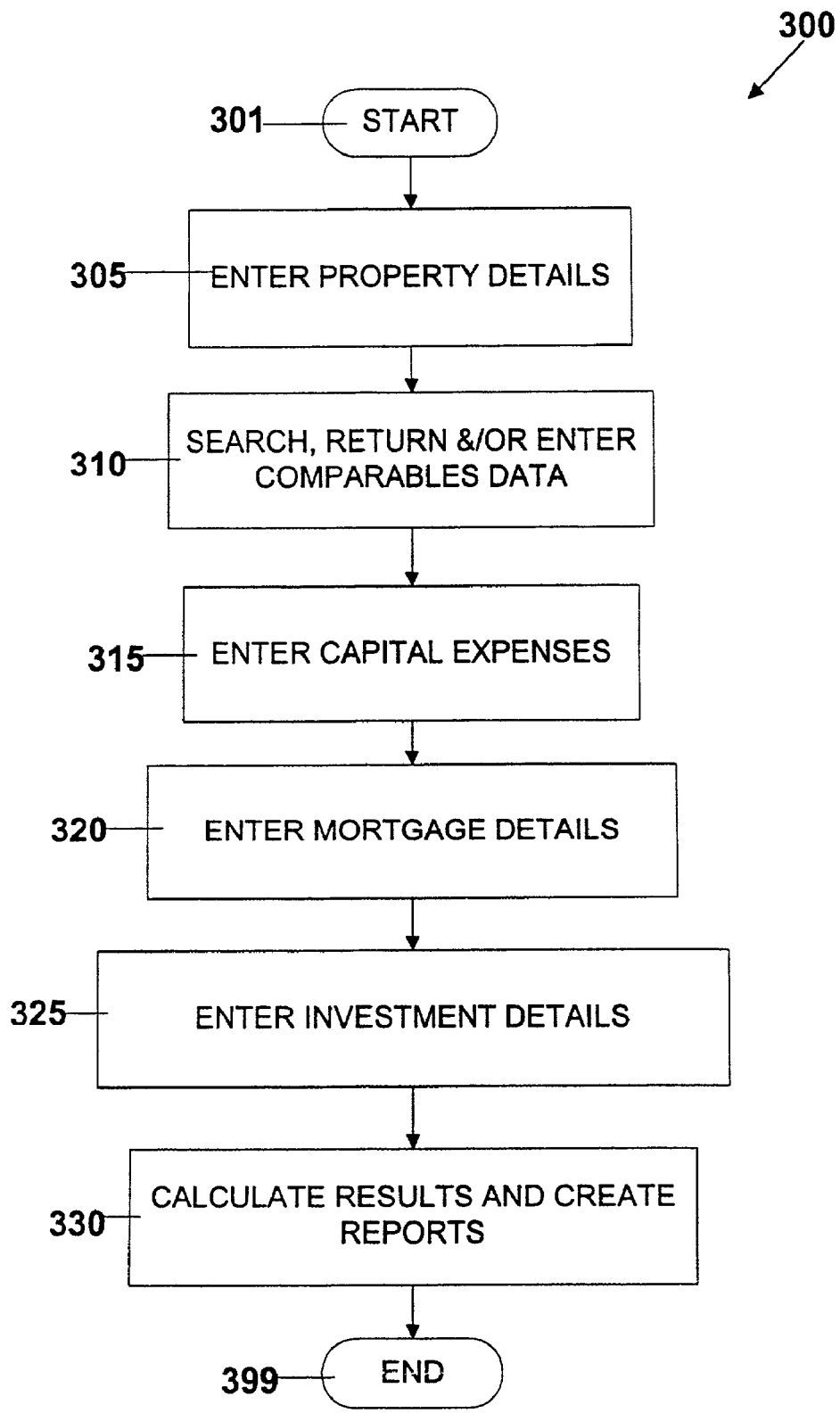
FIGS. 3–9 are flow chart diagrams illustrating exemplary valuation and calculation processes.

FIG. 3 is a flow chart diagram illustrating an exemplary valuation process for calculating an estimate of the value of an asset, such as real property. Turning now to FIG. 3, an exemplary valuation process 300 is initiated at the START step 301 and proceeds to 305. In step 305, a user, typically a property owner, tenant, or lender operating a client computer, defines property details by entering information at a Web site hosted by the property services server platform 145. This Web site includes a valuation tool that embodies the exemplary valuation process 300, which is useful for estimating a value for a property to be purchased, sold, financed, or refinanced.

Typical property details include the property type and subtype, the property name, address, and other property details, such as square footage and year of construction.

In step 310, the property services server platform 145 conducts a search for comparable properties, returns comparable properties, and/or enters comparable properties that match property valuation characteristics for the property-in-issue. The property services server platform 145 typically completes the search by attempting to match the characteristics for the property-in-issue to property-related records maintained by a local database 150 and/or one or more remote property databases. Assuming one or more matches, the comparables are sorted based upon closest match to the property characteristics. In turn, the property services server platform 145 presents sorted comparables to the user via a Web page interface.

In step 315, the user enters capital expenses. The capital expenses can be quick, basic or detailed expenses. In step 320, the user enters mortgage details. The mortgage details include the payment, the rate type and the term. In step 325, the user enters investment details. The investment details include the price, the future value, and the discount rate.

In step 330, the valuation tool operating on the property services server platform 145 calculates a property valuation for the property-in-issue and creates a report. The valuation tool in step 330 can calculate the valuation for this property based upon the entered property details, the market comparables, the capital expenses details, the mortgage details, and the investment details. The END step 399 represents the termination of the valuation process 300.

Leasehold Improvement Calculation Process

Figure 4:
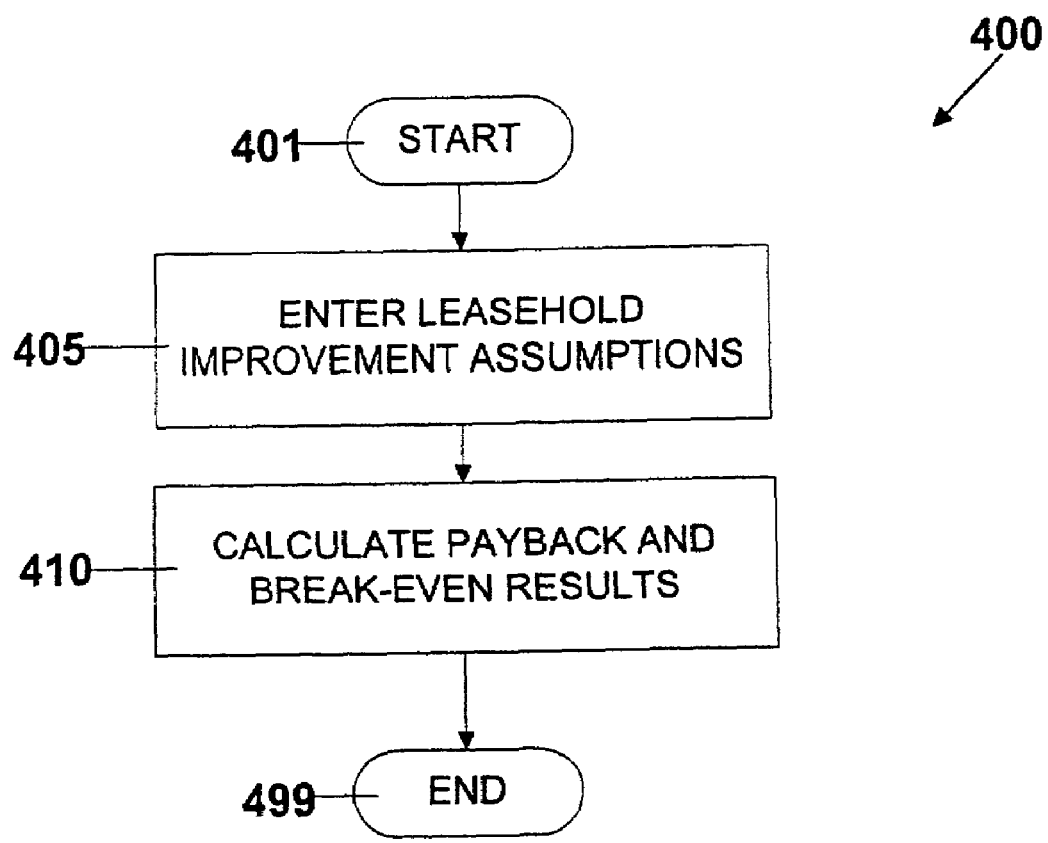

FIG. 4 is a flow chart diagram illustrating an exemplary process for calculating an estimate of the payback and breakeven points of making capital improvements to a property. Turning now to FIG. 4, an exemplary process 400 is initiated at the START step 401 and proceeds to 405. In step 405, the user enters leasehold improvement assumptions. These assumptions include the square footage for the lease, the average annual base rental rate, the lease term, the building standard improvement amount per square foot, the annual interest rate for financing the building standard improvements, and information on above standard improvements. In step 410, the payback and break-even results are calculated based on the above assumptions. The END step 499 represents the termination of the leasehold improvement calculation process 400.

Refinance/Breakeven Calculation Process

Figure 5:
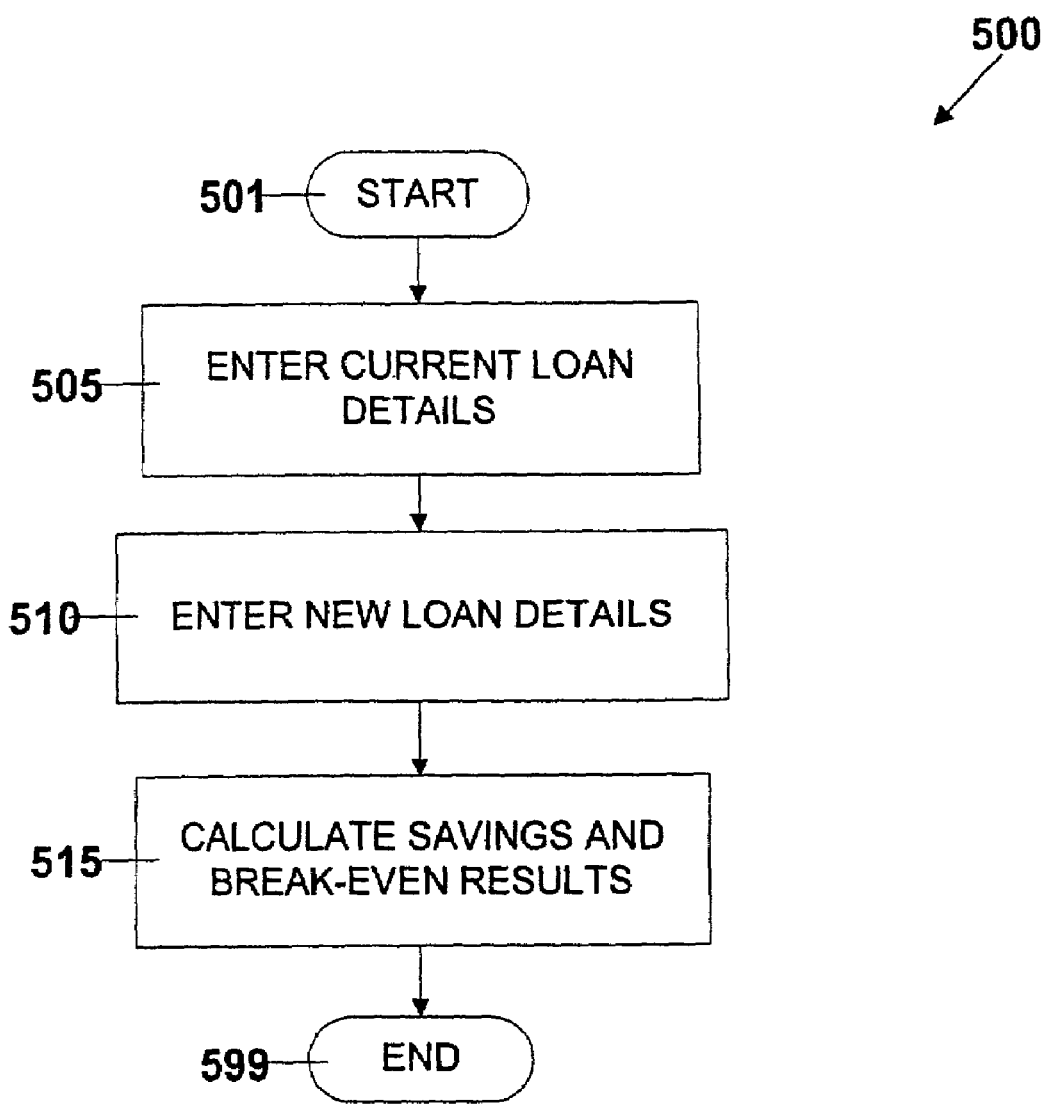

FIG. 5 is a flow chart diagram illustrating an exemplary process for calculating an estimate of the savings and breakeven point of refinancing a property. Turning now to FIG. 5, an exemplary process 500 is initiated at the START step 501 and proceeds to 505. In step 505, the user enters current loan details. These details include the type of mortgage, the type of amortization, the current loan balance, the current annual interest rate, the remaining term, the current payment frequency, the current payment amount, and any prepay penalties. In step 510, the user enters new loan details. These details include what type of mortgage, what type of amortization, the current loan balance, the additional loan amount, points and fees, the annual interest rate, the new loan term, the new payment frequency, whether or not to calculate a payoff amount, and how many years the user plans to own the property. In step 515, the savings and breakeven results are calculated by comparing the mortgage calculated for the current loan with the mortgage calculated for the new loan. The END step 599 represents the termination of the refinance/breakeven calculation process 500.

Direct Capitalization Calculation Process

Figure 6:
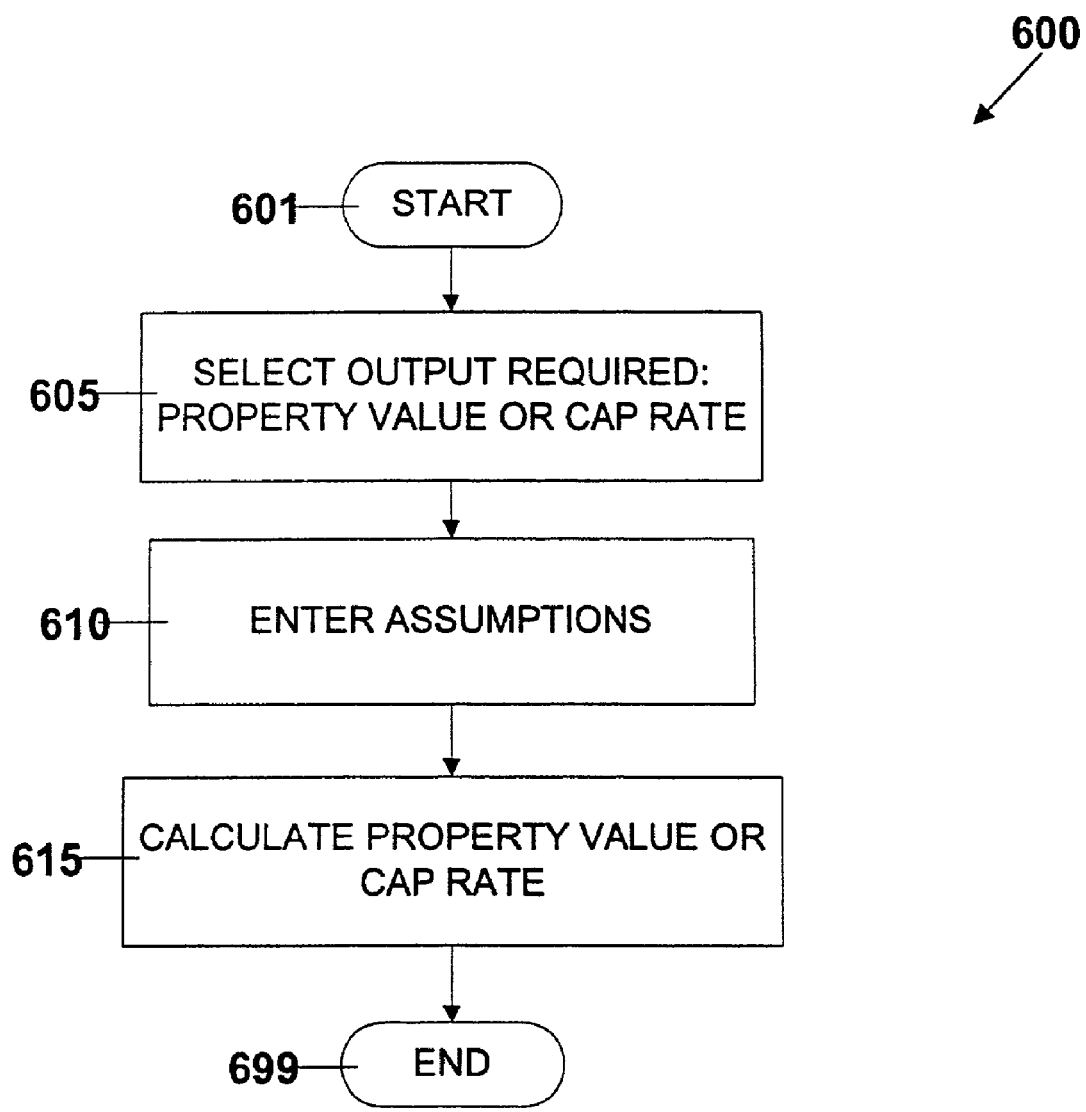

FIG. 6 is a flow chart diagram illustrating an exemplary process for calculating an estimate of the value of a property based on its income and capitalization rate. This process can also calculate an estimate of a property's capitalization rate based on the income and sales price. The income comprises revenue, less expenses, less reserves, less capital expenses. Turning now to FIG. 6, an exemplary process 600 is initiated at the START step 601 and proceeds to step 605. In step 605, the user decides whether she wants to calculate the property value or the capitalization rate. In step 610, the user enters assumptions, which can include the property's net annual operating income, the capital expenses, the sales transaction cost, and the asking sales price. In step 615, the property value or the capitalization rate is calculated based on the net annual operating income, the capital expenses, the sales transaction costs, and the asking sales price. The END step 699 represents the termination of the direct capitalization calculation process 600.

Mortgage Calculation Process

Figure 7:
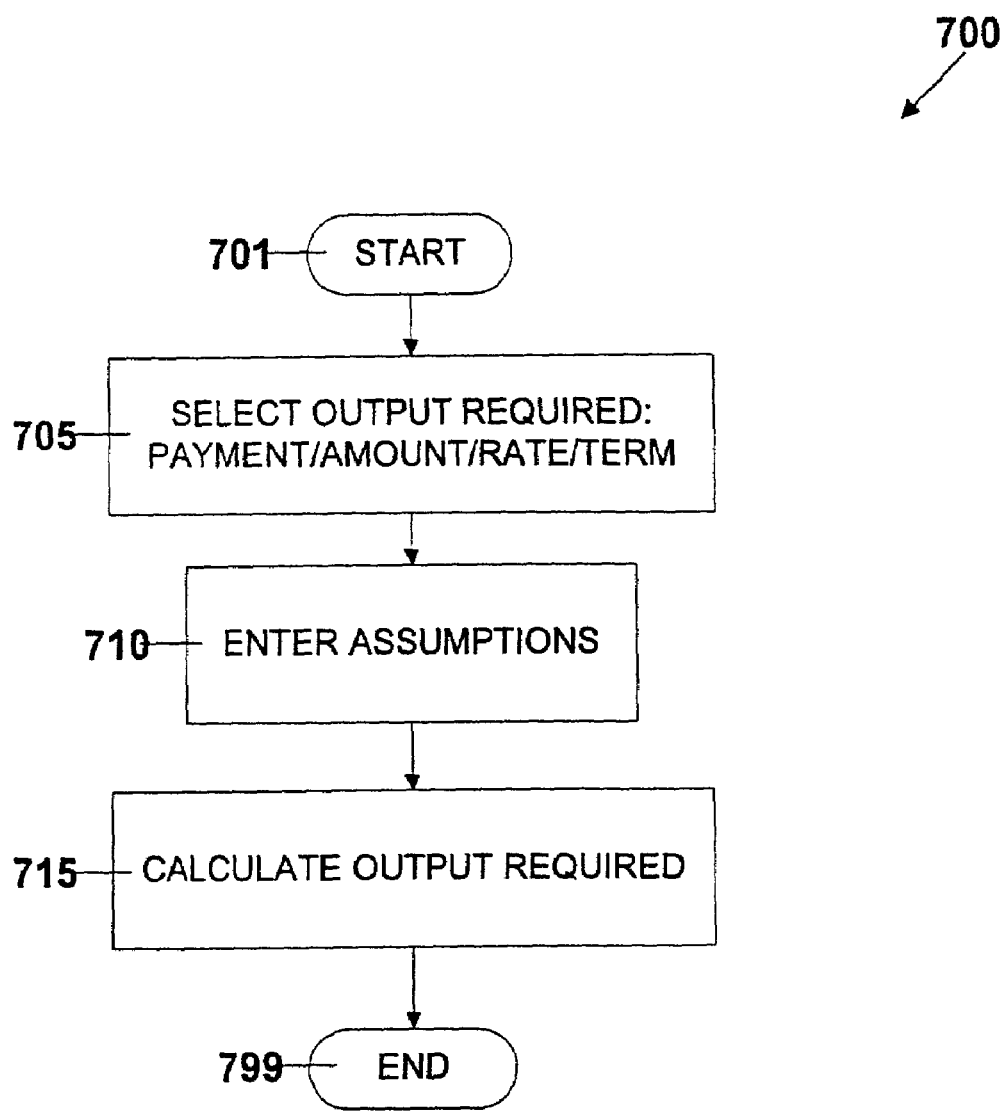

FIG. 7 is a flow chart diagram illustrating an exemplary process for calculating an estimate of mortgage payments on a fixed or variable commercial loan, as well as estimates for the principal and interest payments over the term of a loan. Turning now to FIG. 7, an exemplary process 700 is initiated at the START step 701 and proceeds to step 705. In step 705, the user selects whether he wants to calculate the payment, amount, rate, or term. In step 710, the user enters the assumptions, which can include the type of mortgage, the type of amortization, the loan amount, the interest rate, the loan term, the payment frequency, the first payment date, the payoff amount, after how many payments the payoff will occur, and points and fees. In step 715, the payment, amount, rate, or term is calculated based on the assumptions. The END step 799 represents the termination of the mortgage calculation process 700.

Affordability Calculation Process

Figure 8:
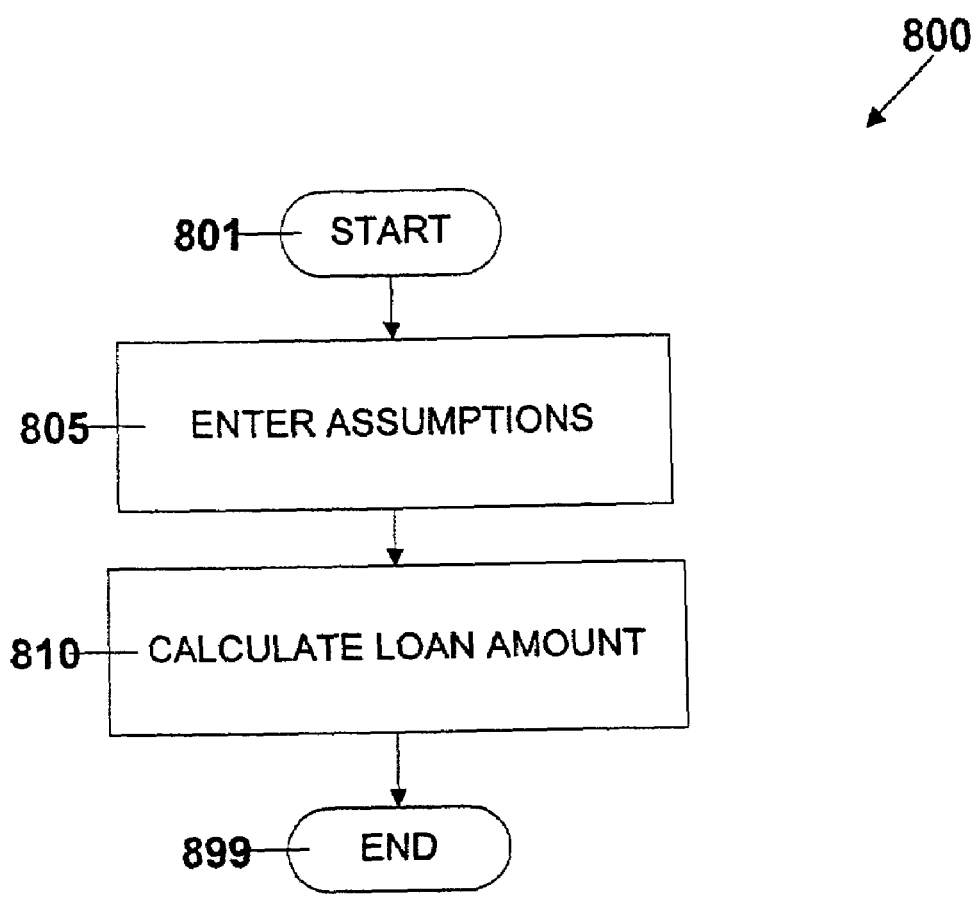

FIG. 8 is a flow chart diagram illustrating an exemplary process for calculating an estimate of the size of an affordable commercial real estate loan based on Net Operating Income (NOI) and basic underwriting criteria. Turning now to FIG. 8, an exemplary process 800 is initiated at the START step 801 and proceeds to step 805. In step 805, the user enters the assumptions. These include the property type, the annual net operation income, the annual debt service, the loan amount, and the property value required. The user also enters the debt service coverage, the payment frequency, the loan term, the interest rate, and the loan-to-value ratio. In step 810, the affordable loan amount is calculated based on the property type, the annual net operation income, the annual debt service, the loan amount, the property value required, the debt service coverage, the payment frequency, the loan term, the interest rate, and the loan-to-value ratio. The END step 899 represents the termination of the mortgage calculation process 800.

Space Calculation Process

FIG. 9 is a flow chart diagram illustrating an exemplary process for calculating an estimate of office space needs. Turning now to FIG. 9, an exemplary process 900 is initiated at the START step 901 and proceeds to step 905. In step 905, the user enters assumptions, which include needs, add-ons and growth information. The needs information includes the number of offices, cubicles, meeting rooms and common areas. In step 910, the current and future space needs are calculated based on the number of rooms, the type of rooms, the square feet per type of room, the add-on factors, and the growth factors. The END step 999 represents the termination of the mortgage calculation process 900.

The Screen Displays

Figure 10:
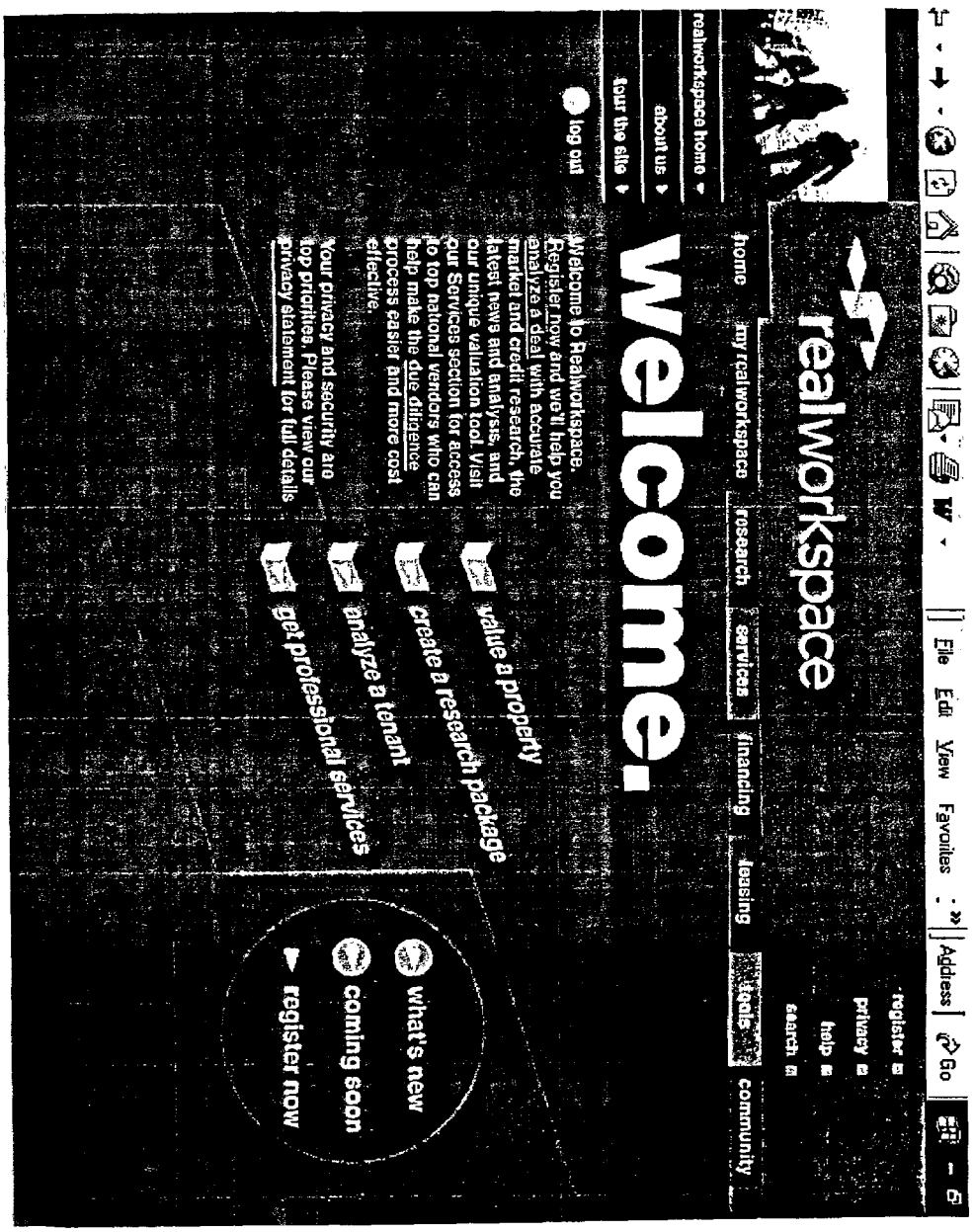
FIG. 10 is a representative log-in display screen for a property services server platform constructed in accordance with an exemplary embodiment of the present invention.

FIG. 10 is a representative log-in display screen for a property services server platform constructed in accordance with an exemplary embodiment of the present invention. Turning now to FIG. 10, the user can access the numerous services available at the property services server platform 145 of FIG. 1 by logging in to the Web site, as shown by the representative display screen 1000 of FIG. 10. Upon completing a log-in operation, the user can access her personalized workspace display 1100 as shown in FIG. 11.

Figure 11:
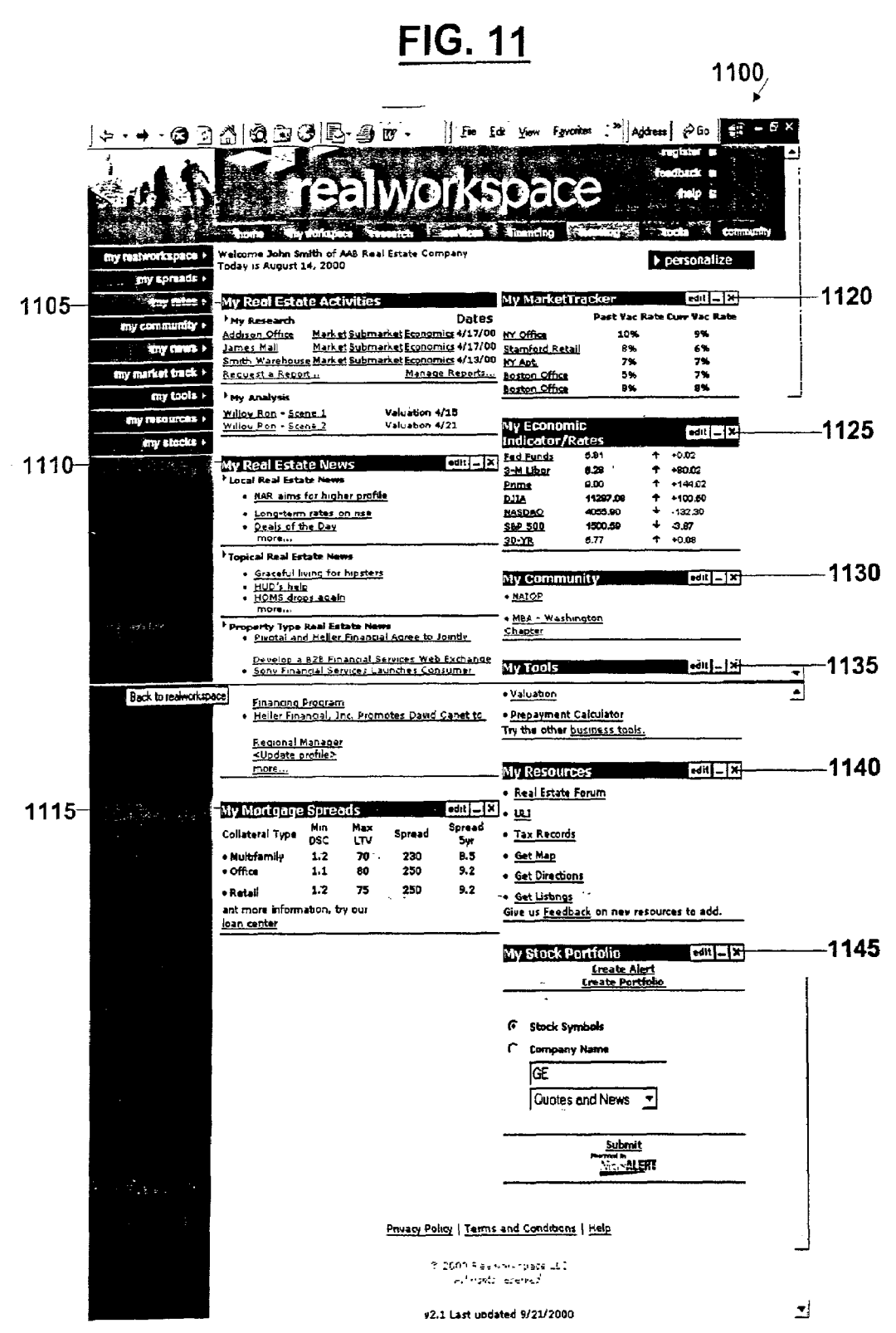

FIG. 11 is a representative display screen illustrating a "personalizable" workspace for real estate operations hosted by a property services server platform in accordance with an exemplary embodiment of the present invention. The personalized workspace pages allows a user to review current real estate activities through "My Real Estate Activities" 1105, to gain access to local, topical, and property-type real estate news through "My Real Estate News" 1110, to gain access to information about mortgage spreads through "My Mortgage Spreads" 1115, markets of interest through "My Market Tracker" 1120, and economic indicators and rates through "My Economic Indicator/Rates" 1125, to enter chat rooms through "My Community" 1130, to access real estate-related calculators or tools through "My Tools" 1135, to obtain information from a variety of selected resources, including real estate information, tax records, maps, directions, and listings, through "My Resources" 1140, and to access a stock portfolio through "My Stock Portfolio" 1145.

Figure 12:
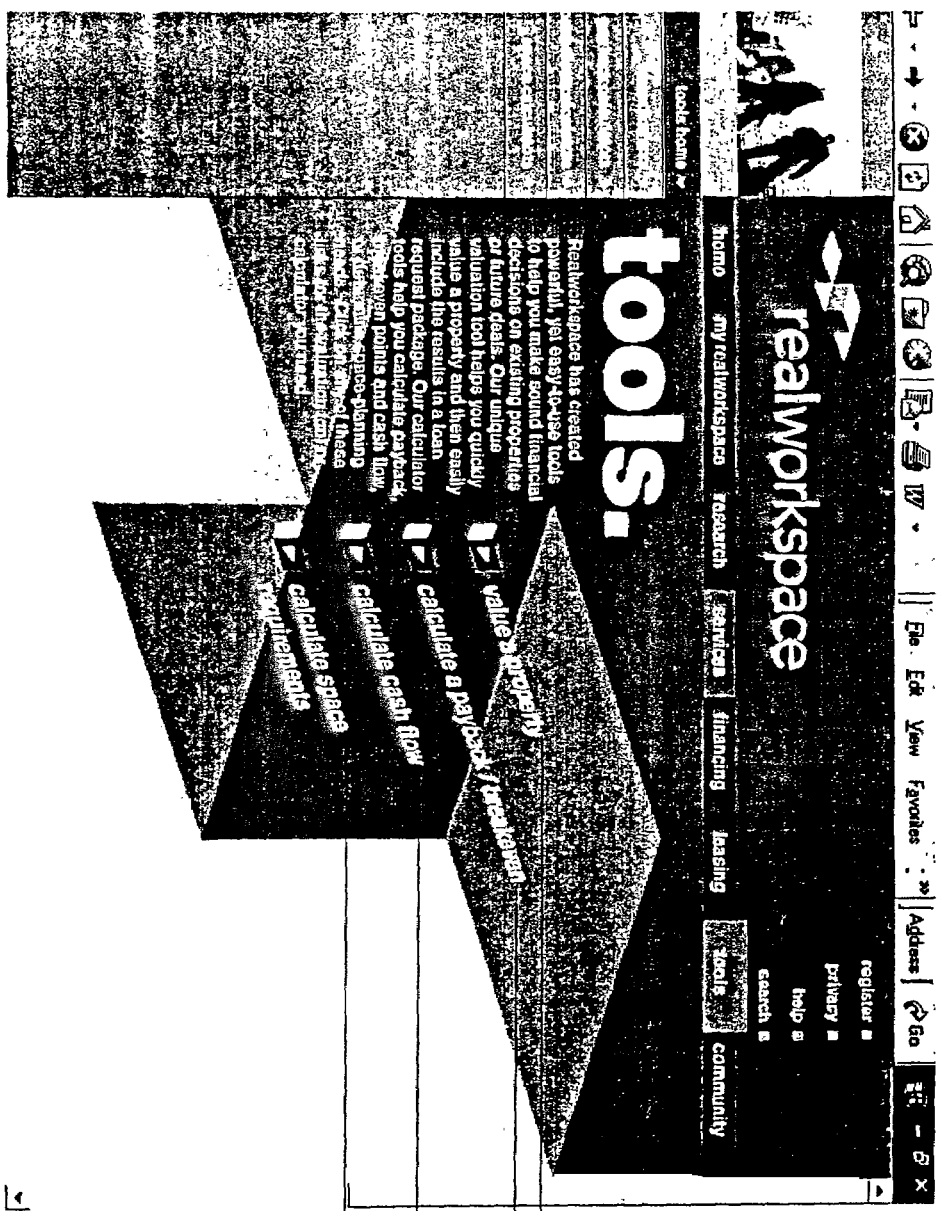
FIGS. 12–14 are representative display screens illustrating application tools maintained by a property services server platform in accordance with an exemplary embodiment of the present invention.
Figure 13:
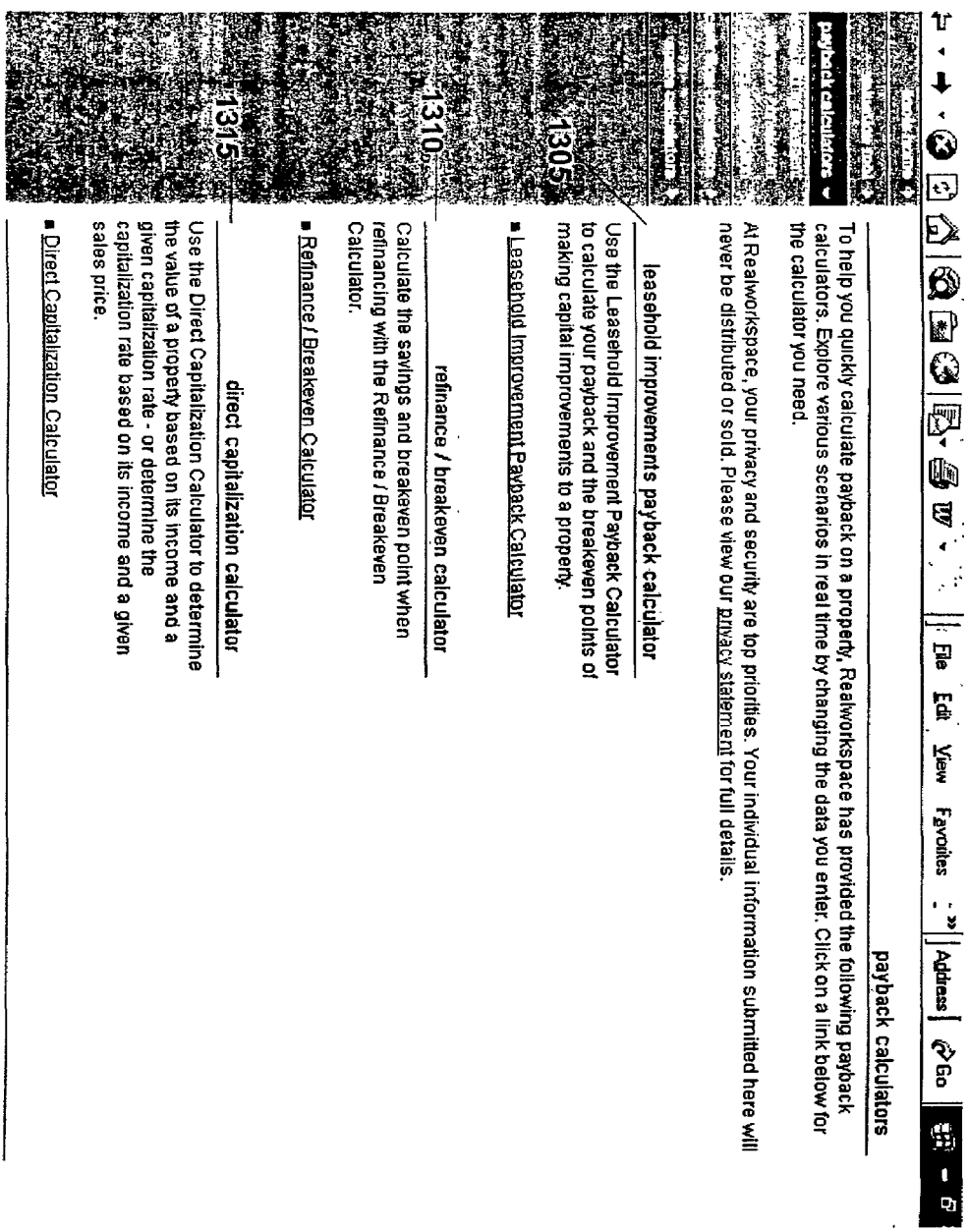
Figure 14:
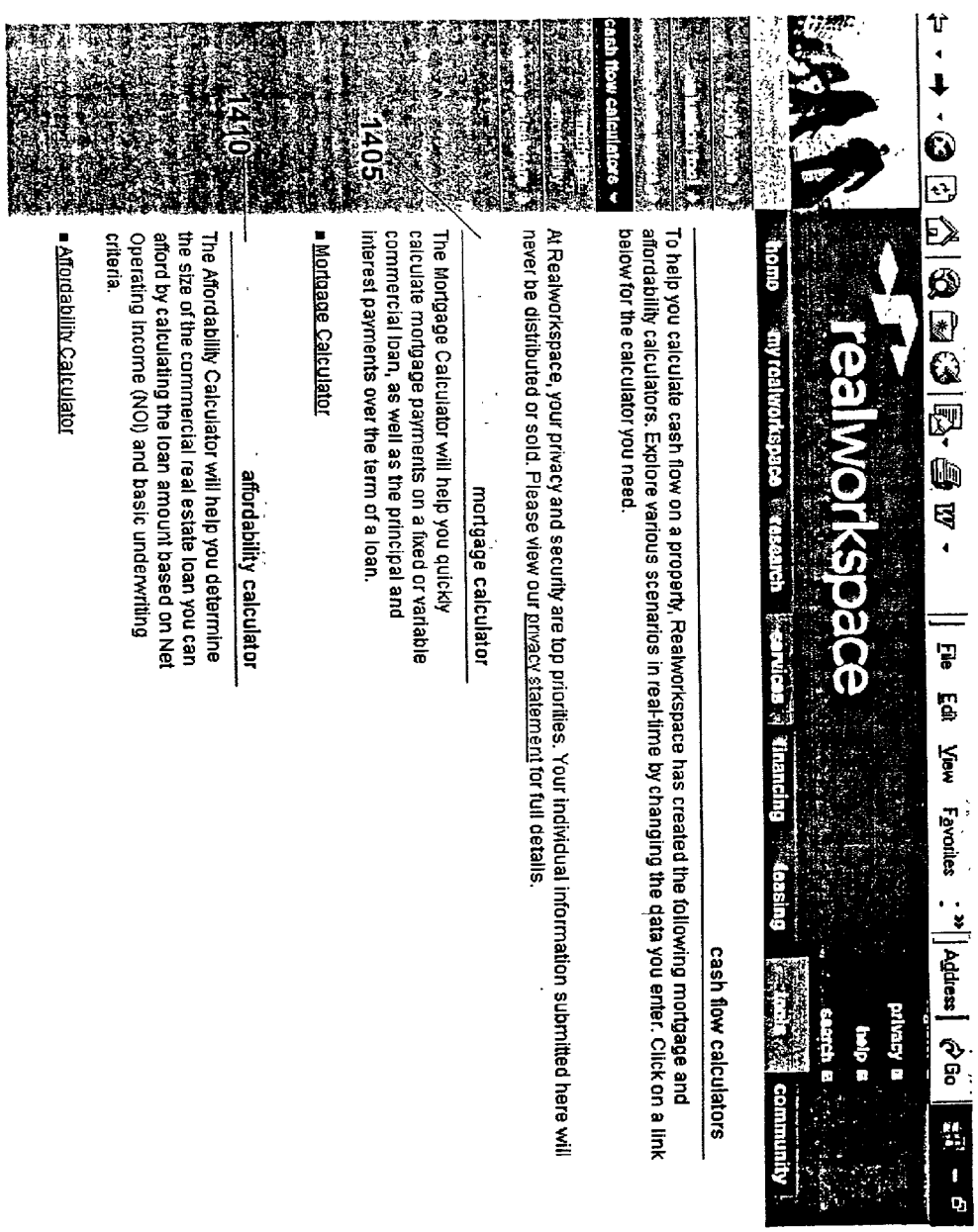

FIG. 12 is a representative display screen illustrating application tools maintained by a property services server platform in accordance with an exemplary embodiment of the present invention. The representative display screen 1200 of FIG. 12 provides a listing of the representative tools hosted by the property services server platform. These tools can value a property 1205, calculate a payback/breakdown 1210, calculate cash flow 1215, or calculate space requirements 1220. Representative display screens for the value a property option can be found in FIG. 15. FIG. 13 is a representative display screen illustrating the calculate a payback/breakdown 1210 options in accordance with an exemplary embodiment of the present invention. Display screen 1300 includes the "Lease Improvement Calculator" 1305, the "Direct Cap Calculator" 1310, and the "Refinance/Breakeven Calculator" 1315. Representative display screens for these options are represented in FIGS. 16–18. FIG. 14 is a representative display screen illustrating the calculate cash flow 1215 options in accordance with an exemplary embodiment of the present invention. Display screen 1400 includes the "Mortgage & Amortization Calculator" 1405 or the "Affordability Calculator" 1410. Representative display screens for these options are represented in FIGS. 19–20. Representative display screens for the calculate space option can be found in FIG. 21.

Valuation Calculator

FIGS. 15a–15h, collectively described as FIG. 15, are representative display screens for initiating a valuation for a selected property in accordance with an exemplary embodiment of the present invention. In response to selecting the valuation tool at the Web site hosted by the property services server platform 145, the user is greeted with a representative display screen 15a00 shown in FIG. 15a to prompt the start of a new valuation calculation. The representative display screen in FIG. 15a allows the user to choose between modifying an existing property valuation 15a05 or valuing a new property 15a10. If the user chooses to modify an existing property valuation 15a05, she will be taken to display a screen 15b00 of FIG. 15b, where she can select an existing valuation for modification.

If the user chooses to value a new property 15a10, she will be prompted to create a new property valuation based upon the selection of a detail level 15a15, such as quick, basic, or detailed. Once the user chooses a detail level, such as quick, the valuation process begins. This is a six step process. For the first step, the user will be taken to display screen 15c. This display screen prompts the user to select whether the valuation calculation is to be completed for a property to be purchased 15c05, to be sold 15c10, or to be financed or refinanced 15c15. The user also can enter the version 15c20 and the holding period 15c25 The user is also prompted to complete valuation details for a particular property via this representative display screen shown in FIG. 15c. Typical property information details include property type 15c30, property name and address 15c35, and property details 15c40.

In step 2, the user can enter annual property operating data at the representative display screen 15d00 shown in FIG. 15d. At the operating data display screen, the user can enter prompted information about both income and expenses. For example, an effective gross income 15d15 can be calculated based upon entries for potential gross income 15d05 and vacancy and credit loss 15d10 information. Net operating income 15d25 can be calculated based upon the effective gross income 5d15 and the operating expenses 15d20, as shown in FIG. 15d.

In step 3, the user can enter information about capital expenses, including tenant improvements 15e05, leasing commissions 15e10, and capital reserves 15e15 by completing the information prompts presented by the representative display screen 15e00 of FIG. 15e.

Figure 15A:
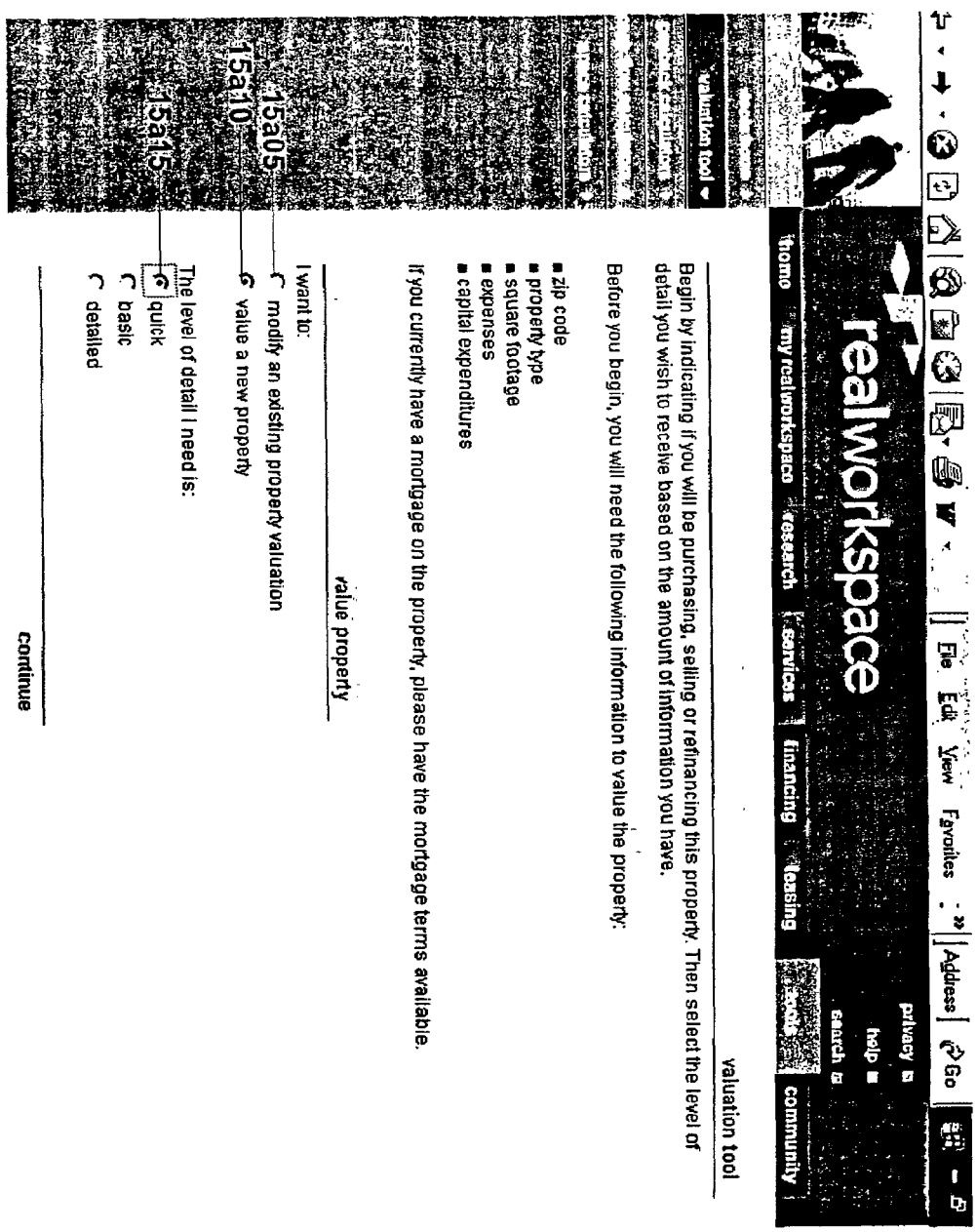
Figure 15B:
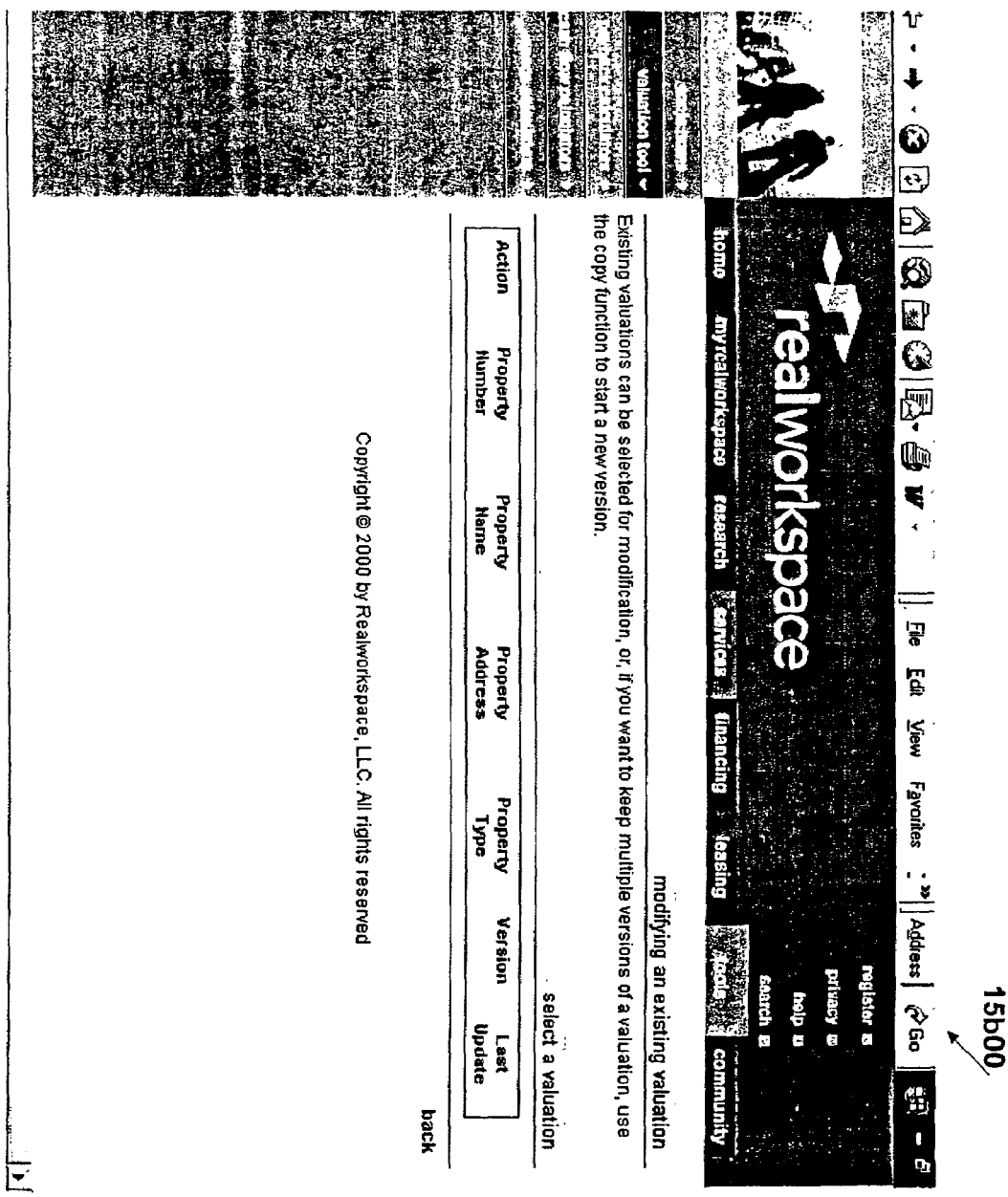
Figure 15C:
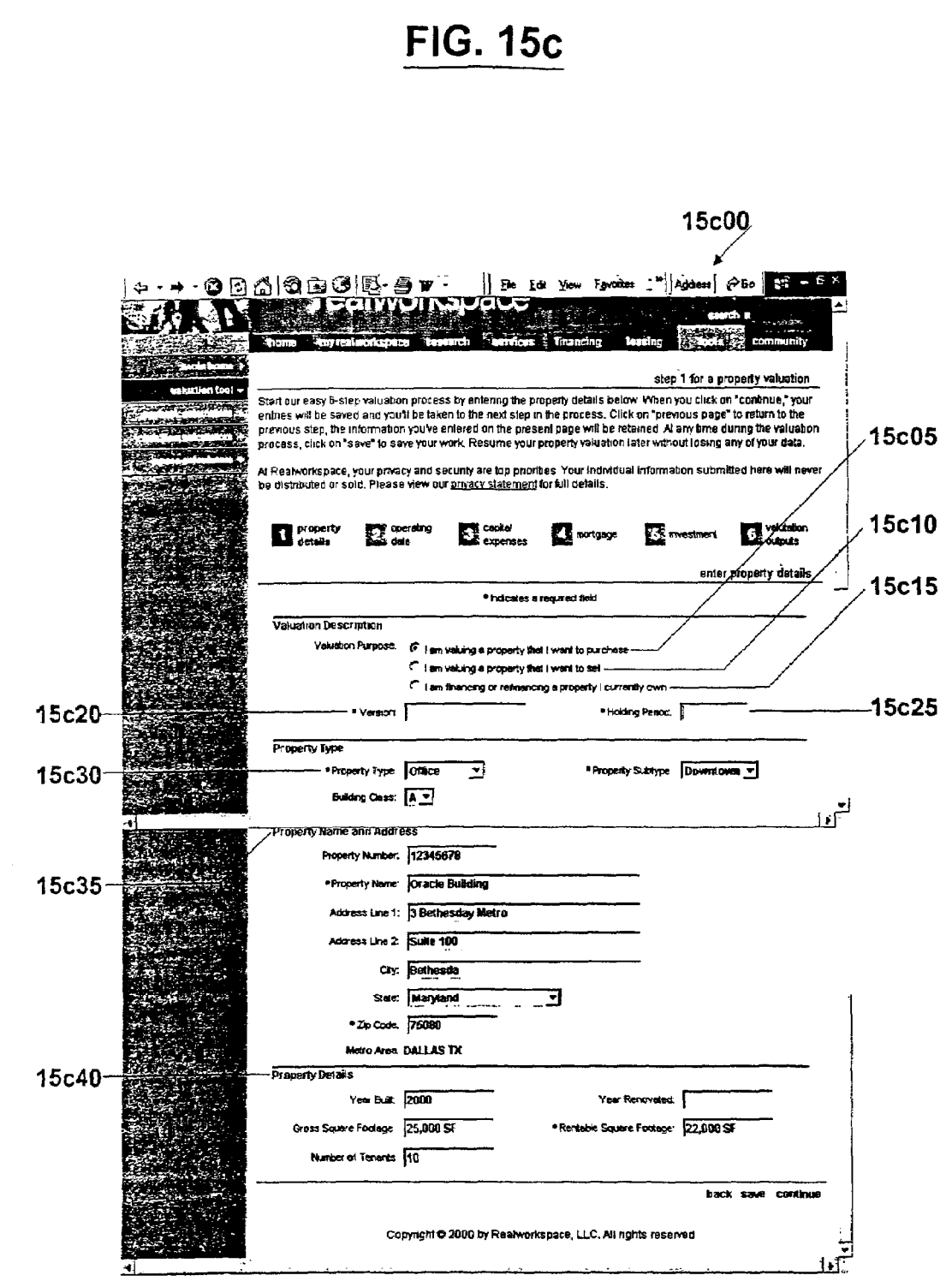
Figure 15F:
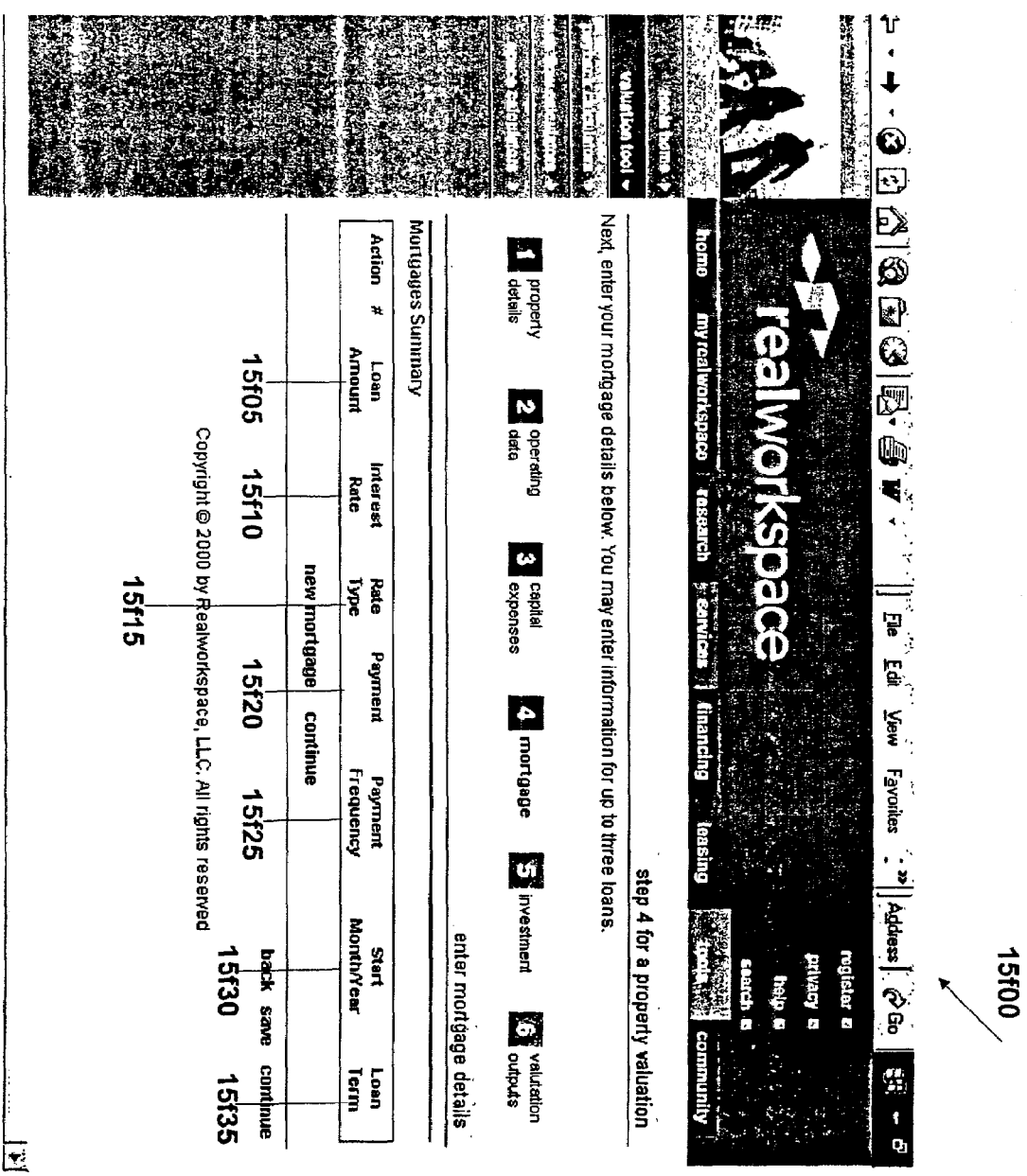

In step 4, the user can enter operating details for the property under consideration by completing mortgage details illustrated in the representative display screen 15f00 of FIG. 15f. For example, typical mortgage details for a fixed interest mortgage include loan amount 15f05, interest rate 15f10, rate type 15f15, payment amount 15f20, payment frequency 15f25, date of first payment 15f30, and loan term 15f35.

Figure 15G:

In step 5, the user can complete an investment profile and related assumptions by completing the information prompts presented by the representative display screen 15g00 in FIG. 15g. The user can complete information about the discount rate 15g05, including the discount rate 15g10 and the already entered holding period 15g15. The user can also enter information on the purchase of property 15g20, including the contract purchase price 15g25, the transaction costs 15g30, and the fees for purchase 15g35. Finally, the user can include information on the future sale of property 15g40, including the transaction costs as a percent of future sales 15g45, the fees for future sale 15g50, and the estimated future value 15g55.

In step 5, upon completing the information requested by the display screens shown in FIGS. 15a–g, the valuation tool can publish an asset valuation report, as shown by the representative display screen 15h00 of FIG. 15h. The asset valuation report typically presents a description of the property 15h05, the basic inputs completed by the user 15h10, a performance ratio summary 15h15, and a list of comparables 15h20. Although FIG. 15h illustrates an asset valuation report presenting a summary of the user's inputs, the valuation tool can generate a variety of report formats, including cash flow projection and ratio analysis, IPV/IRR/ asset validation, and proceeds from sale. Typical actions available to the user from a display screen presenting the asset valuation report include contacting a seller, getting a financing estimate, hiring a third party expert, creating a deal package, running a customized projection, bidding on a property, and adding to "my deals". Advantageously, the representative display screen in FIG. 15h presents an asset valuation report placing customer information and calculated information adjacent to corresponding comparables to assist the user's comparison of property information relevant to per transaction.

Lease Improvement Calculator

Figure 16B:
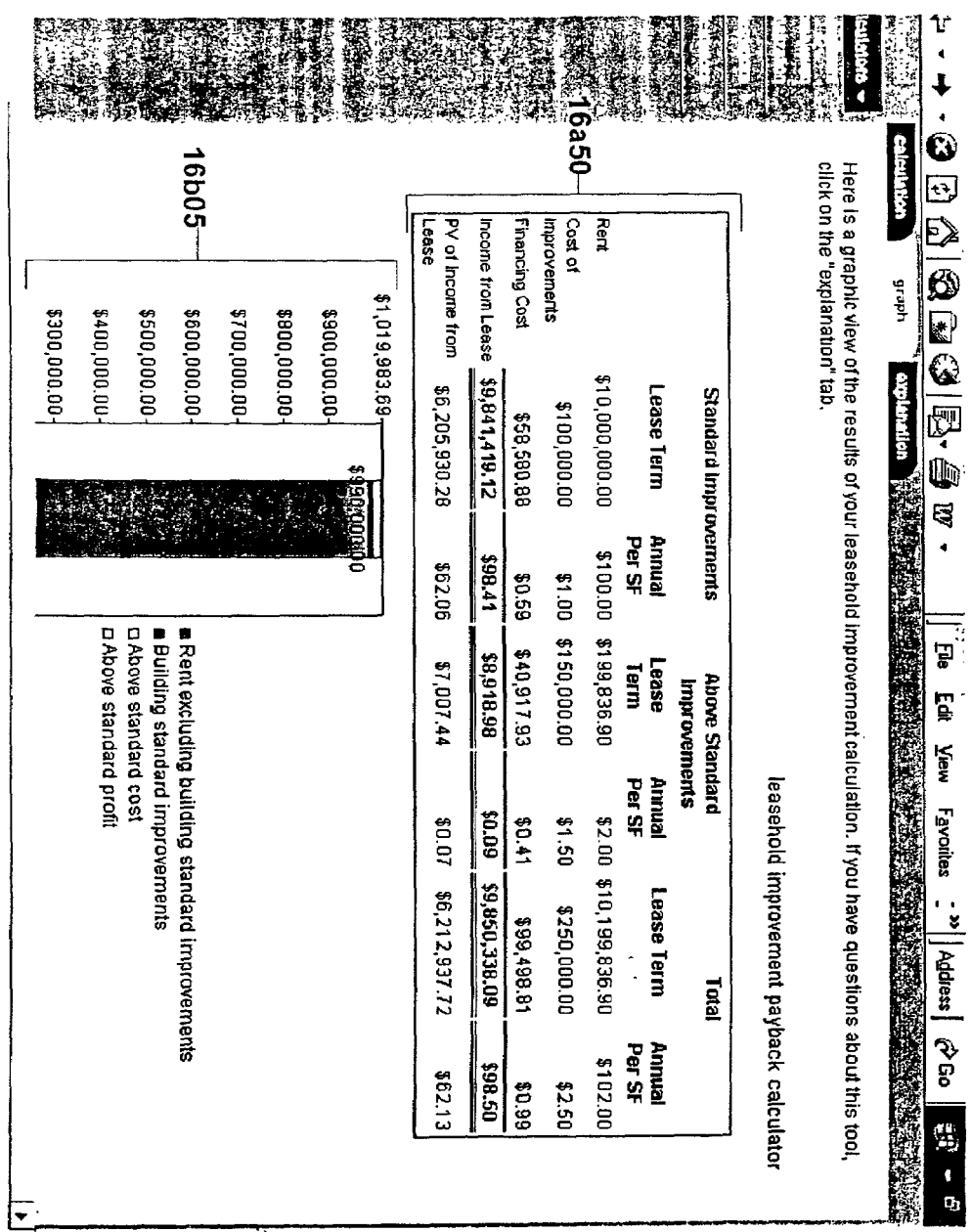
Figure 16C:
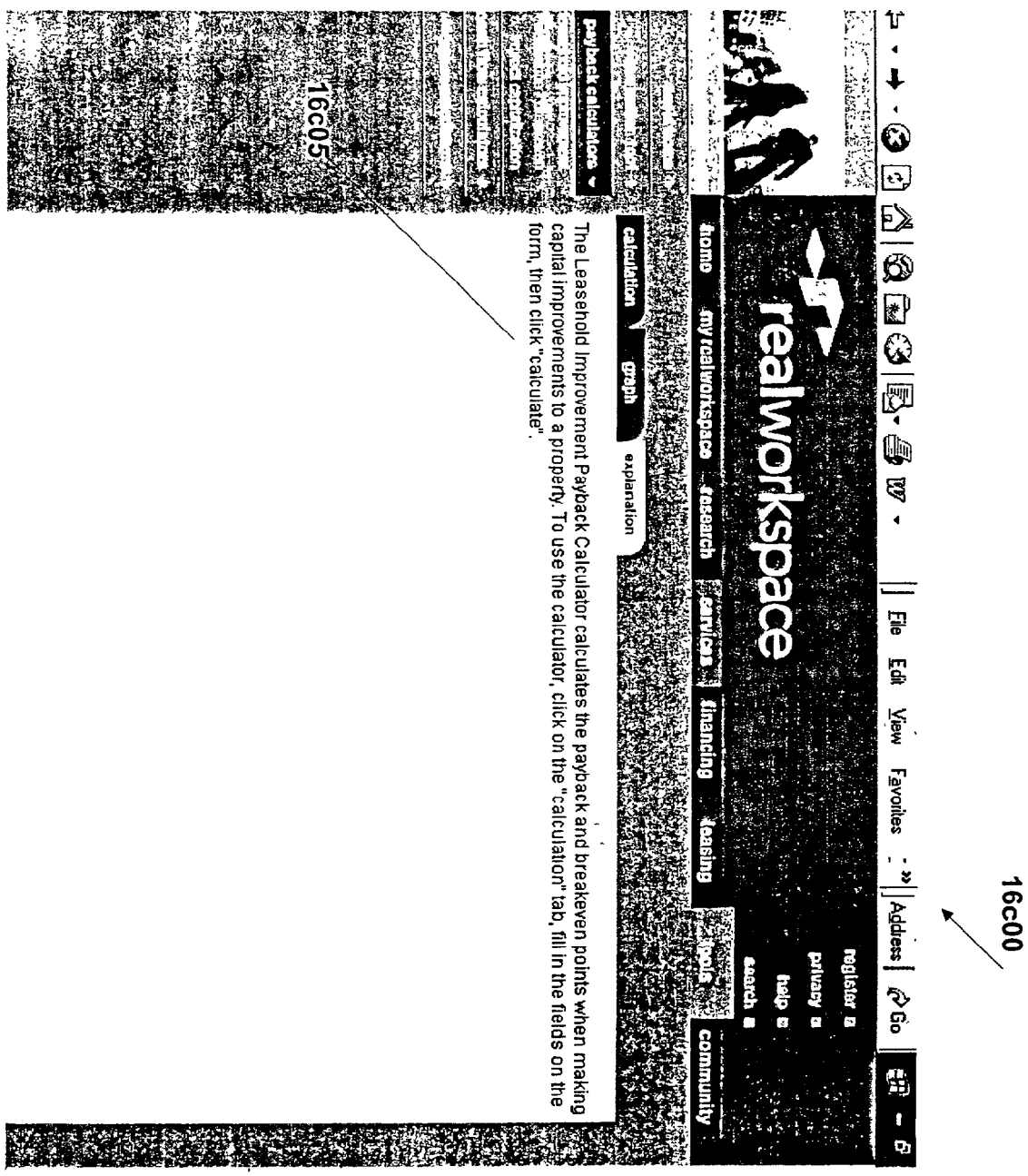

FIGS. 16a–16c, collectively described as FIG. 16, are representative display screens illustrating a tool for calculating how much of a standard rent can be allocated to building standard improvements and to profits made on those standard improvements in accordance an alternative exemplary embodiment of the present invention. In response to selecting the direct cap calculator tool at the Web site hosted by the property services server platform 145, the user is greeted with a representative display screen 16a00 shown in FIG. 16a. The representative display screen in FIG. 16a prompts the start of a new lease improvement calculation. This allows the user to Figure out how much standard rent will go towards building standard improvements, and how much profit can be made on above standard improvements. FIG. 16a prompts the user to create a new lease improvement valuation based upon the square feet for the lease 16a05. In addition, this display screen prompts the user to select the property's average annual base rental rate 16a10 and the lease term 16a15. This display screen also allows the user to enter the building standard improvement amount 16a20 and the annual interest rate for financing building standard improvements 16a25. The user can also input whether or not there are above standard improvements 16a30, and the amount per square foot of the above standard improvements 16a35. Finally, the user can enter in the annual interest rate for financing the above standard improvements 16a40, and the annual interest rate charged to the tenant for above standard improvements 16a45.

Upon completing the information requested by the display screen shown in FIG. 16a, the lease improvement calculator tool can publish a lease improvement report 16a50 at the bottom of FIG. 16a. This includes information on the probably value of income. FIG. 16b shows a display screen 16b00 that has the lease improvement report 16a50 in a graphical report 16b05.

FIG. 16c illustrates a display screen 16c00 with the explanation 16c05 of the leasehold improvement payback calculator. This indicates that the leasehold improvement payback calculator calculates the payback and breakeven point when making capital improvements to a property. The explanation 16c05 also indicates how to use the calculator.

Refinance/Breakeven Calculator

Figure 17A:
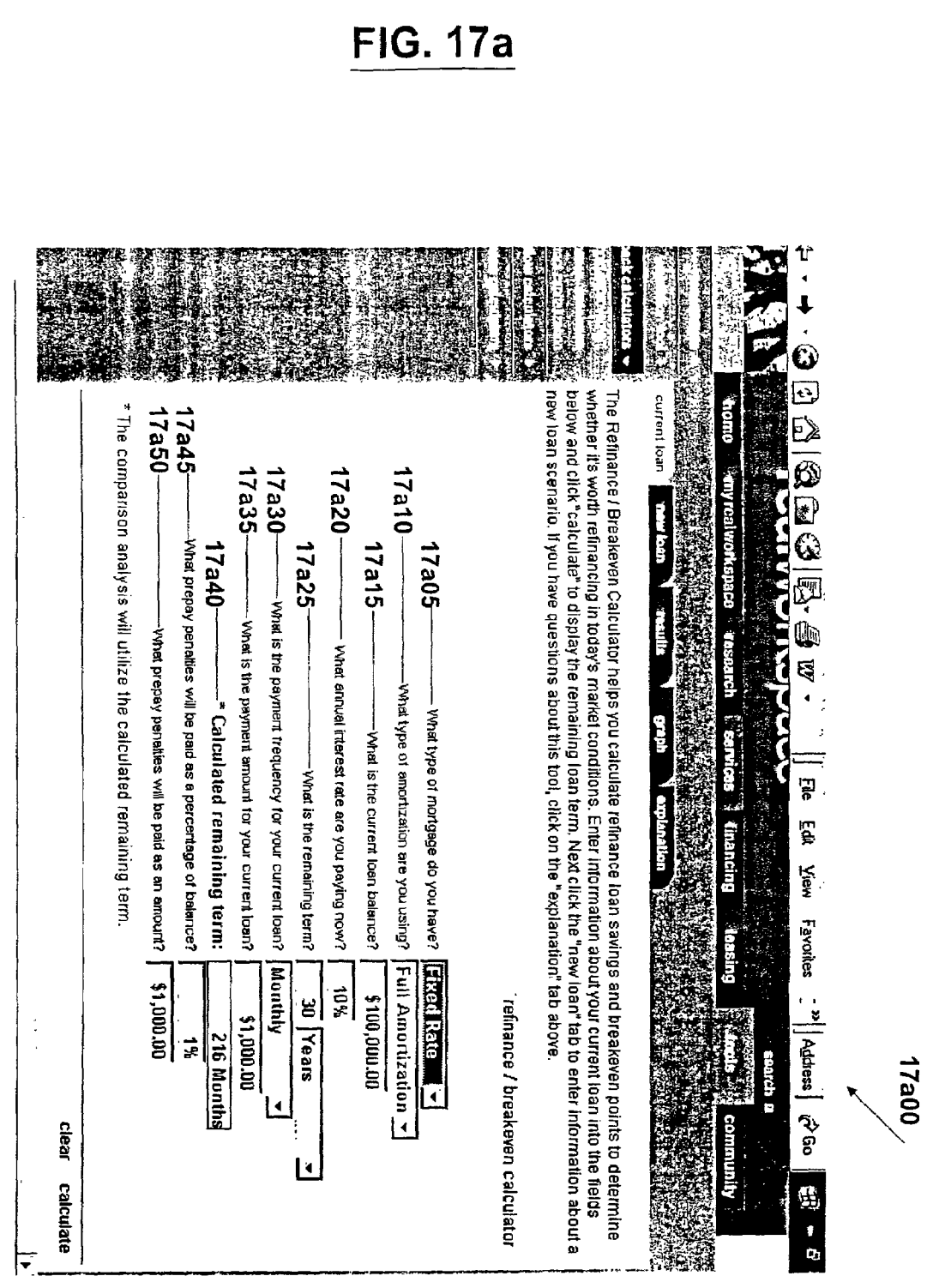
Figure 17D:
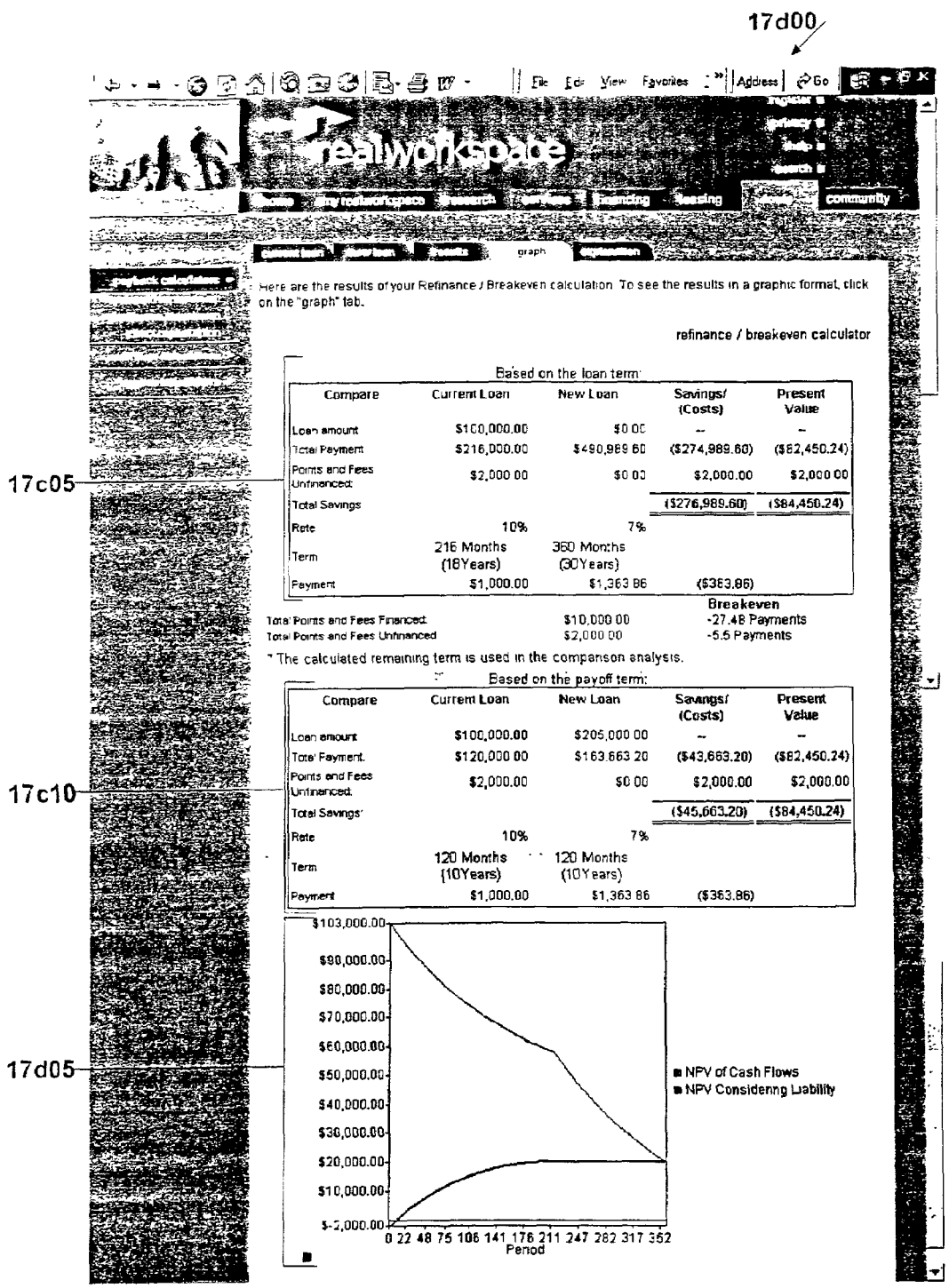
Figure 17E:
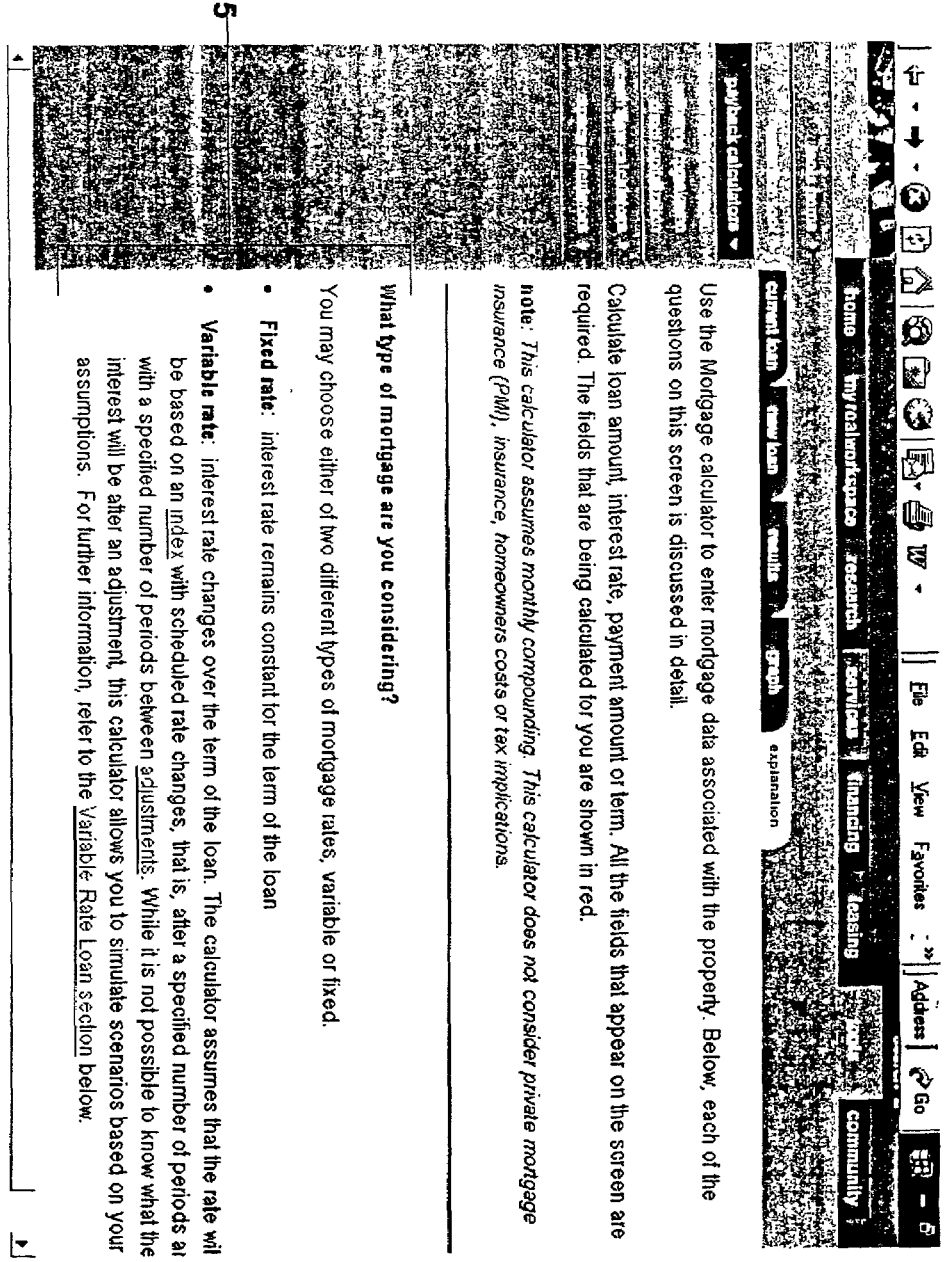
Figure 17E:
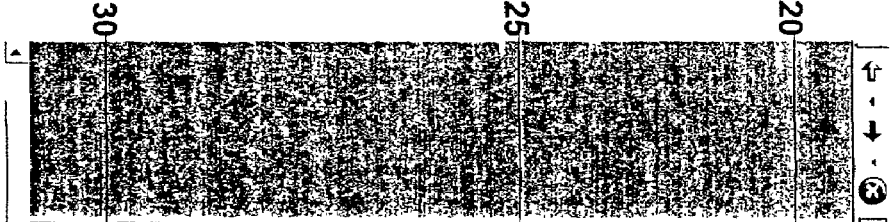

FIGS. 17a–17e, collectively described as FIG. 17, are representative display screens illustrating the a variety of refinancing calculations in accordance with an alternative exemplary embodiment of the present invention. In response to selecting the refinance/breakeven calculator tool at the Web site hosted by the property services server platform 145, the user is greeted with a representative display screen 17a00 shown in FIG. 17a. This tool allows the user to calculate refinance loan savings and breakeven terms. The representative display screen in FIG. 17a prompts the start of a new refinance/breakeven calculation. This allows the user to figure out whether or not to refinance given the difference between an existing loan and a market loan. FIG. 17a prompts the user to enter information on the user's current loan. This screen allows the user to create a new refinance/breakeven valuation based upon the type of mortgage 17a05 and whether or not there is a balloon payment, or if it is interest only 17a10. In addition, this display screen prompts the user to indicate the current balance is 17a15. This display screen also allows the user to enter the interest rate the user is currently paying 17a20, the remaining term 17a25, the payment frequency 17a30, and the payment amount for the current loan 17a35. The remaining term 17a40 can then be calculated. Finally, any penalties charged for prepaying the loan 17a45 and 17a50 can be added.

FIG. 17b prompts the user to create a new refinance/ breakeven valuation and has the user input information on the refinancing mortgage option. This display screen 17b00 prompts the user to enter information on the type of mortgage that is being considered 17b05, and what type of amortization 17b10. This display screen then calculates the new loan amount 17b15. The user then enters the additional loan amount 17b20 and the points and fees in 17b25 and 17b30. The calculator then determines the total new loan amount 17b35. The annual interest rate 17b40, the new loan term 17b45, and the new payment frequency 17b50 are entered. The calculator then determines the payment 17b55. Finally, the points and fees are entered in 17b60 and 17b65, the user decides whether to calculate a payoff amount in 17b70 and enters how many years she plans to own the property in 17b75. Finally the calculator determines the payoff amount 17b80.

Upon completing the information requested by the display screens 17a00 and 17b00 shown in FIGS. 17a and 17b, the new finance/breakeven calculator tool publishes a new finance/breakeven report on the display screen 17c00 as shown in FIG. 17c. This report indicates the breakeven amount based on the loan term 17c05, and the amount based on the payoff term 17c10. The display screen 17d00 of FIG. 17d illustrates the finance/breakeven reports 17c05 and 17c10 in graph form 17d05.

FIG. 17e illustrates the display screen 17e00 that explains the new finance/breakeven calculator. This display screen 17e00 explains the different types of mortgages 17e05, the different types of amortization 17e10, how to calculate a payoff amount 17e15, how to determine the first payment date 17e20, how to calculate the interest rate inclusive of points and fees 17e25, how to calculate the periods before the first adjustment 17e30, how many periods between adjustments 17e35, the maximum rate adjustments 17e40. Definitions are also included on the minimum rate, 17e45, the initial index value 17e50, the margin 17e55, and the index change per adjustment 17e60. Definitions are also included for break even 17e65, savings 17e70, and present value 17e75.

Direct Capitalization Calculator

Figure 18A:
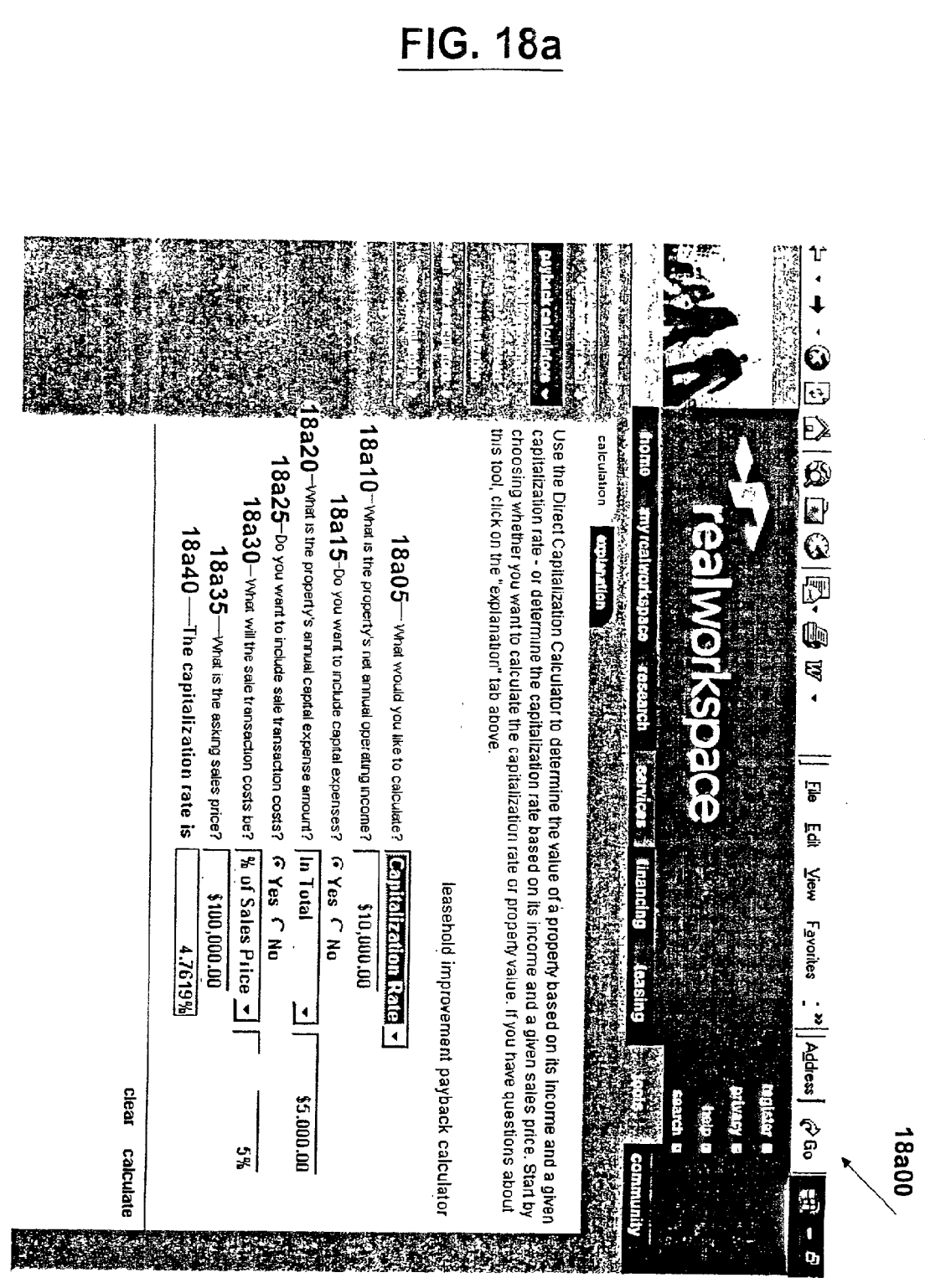
Figure 18B:
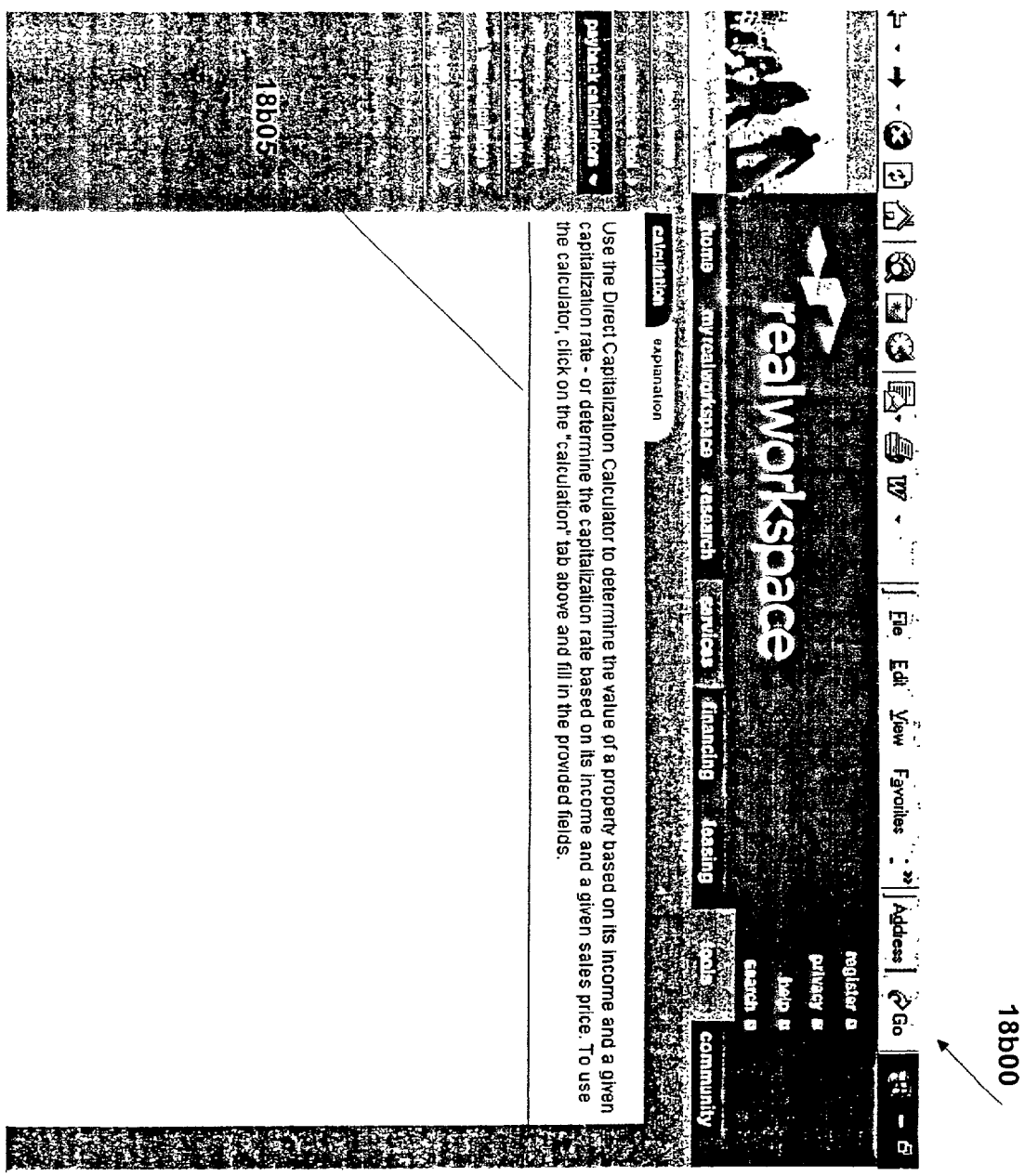

FIGS. 18a–18b, collectively described as FIG. 18, are representative display screens illustrating a tool for calculating a capitalization rate for a selected property in accordance with an alternative exemplary embodiment of the present invention. The direct capitalization calculator enables users to determine the value of a property based on its income and a given capitalization rate, or determine the capitalization rate based on its income and a given sales price. In response to selecting the direct cap calculator tool at the Web site hosted by the property services server platform 145, the user is greeted with a representative display screen 18a00 shown in FIG. 18a.

In FIG. 8a, the user can enter what she wants to calculate 18a05, the property's net annual operating income 18a10, whether to include capital expenses 18a15, and if "YES", the annual capital expense amount 18a20, whether to include sale transaction costs 18a25, and if so the sale transaction costs 18a30 and the asking sales price 18a35. The capitalization rate 18a40 is then calculated.

Display screen 18b00 of FIG. 18b has an explanatory section 18b05 that explains what the direct capitalization calculator is meant to do, and how to use it.

Mortgage and Amortization Calculator

FIGS. 19a–19e, collectively described as FIG. 19, are representative display screens illustrating the calculation of an amortization schedule for a mortgage in accordance with an alternative exemplary embodiment of the present invention. In response to selecting the mortgage and amortization calculator tool at the Web site hosted by the property services server platform 145, the user is greeted with a representative display screen 19a00 shown in FIG. 19a. This tool allows the user to calculate mortgage payments on a fixed or variable commercial loan, as well as principal and interest payments over the term of a loan. The representative display screen 19a00 in FIG. 19a prompts the user to enter information on the mortgage that is being considered. This screen allows the user to enter what is being calculated 19a05, the type of mortgage that is being considered 19a10, the type of amortization (balloon type or interest only) 19a15. The user can also enter the loan amount 19a20, the interest rate 19a25, the loan term 19a30, the payment frequency 19a35, and the first payment date 19a40.

Upon completing the information requested above, the payment 19a45, mortgage constant 19a50, and annual payment 19a55 are calculated. Then the user is asked if she wants to calculate a payoff amount 19a60. If "YES", the user enters how many payments she wants before the payoff 19a65. The calculator then calculates the payoff amount 19a70. The user is then asked if she wants to calculate the interest rate inclusive of points and fees 19a75. If "YES", the user enters the points and fees that will be paid as a percentage 19a80, and the fees that will be paid as an amount 19a85. The calculator then determines the rate with points included 19a90.

Figure 19A:
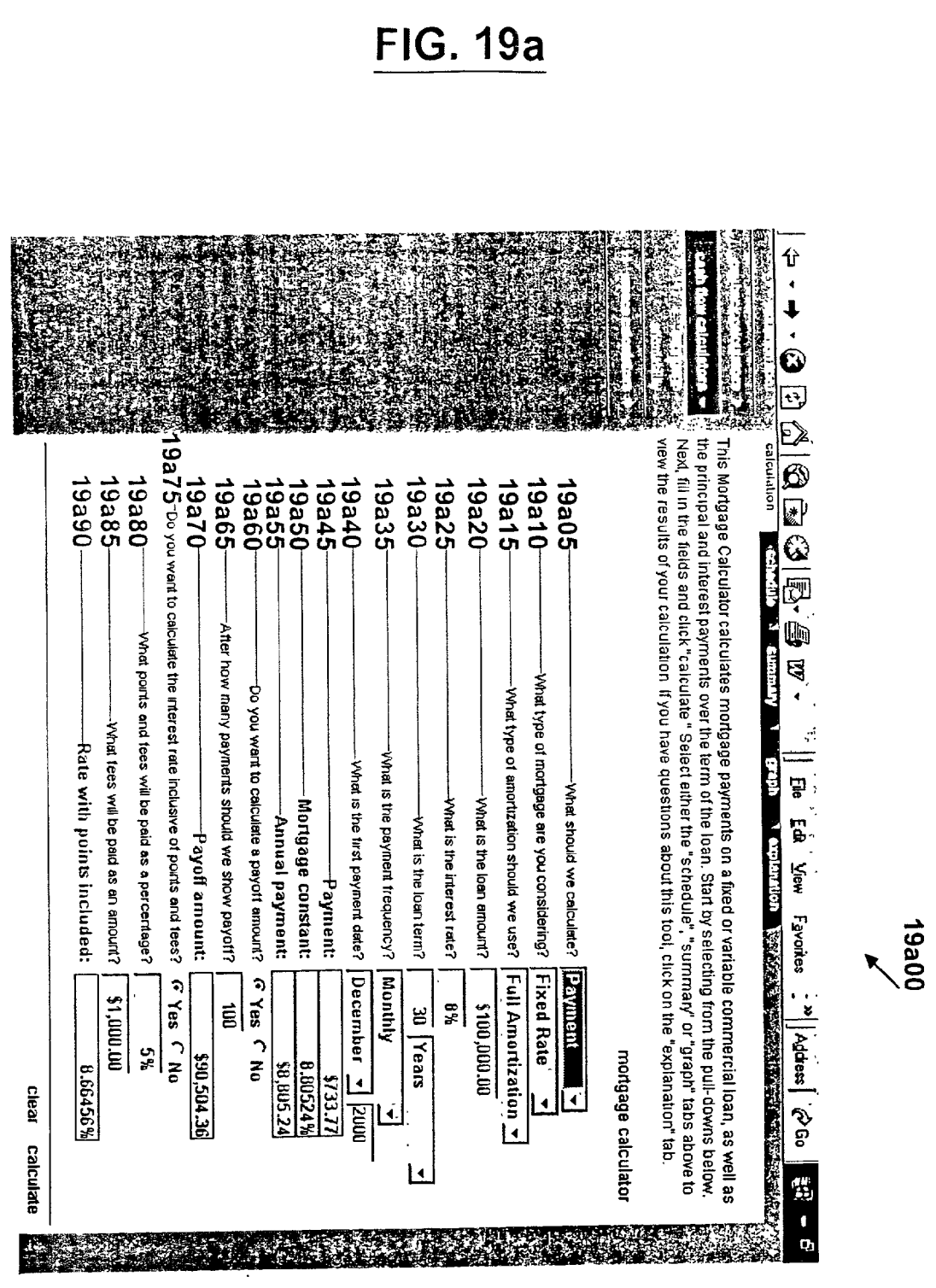
Figure 19B:
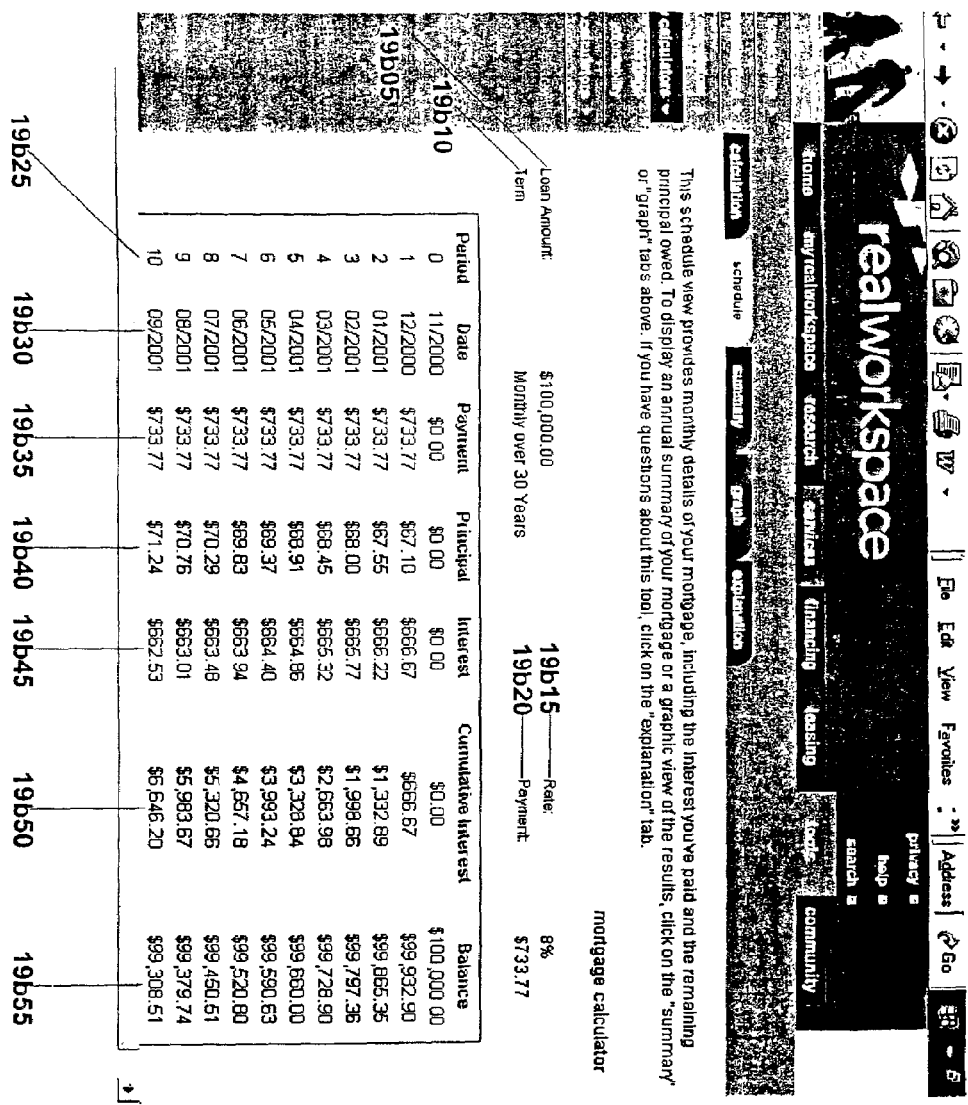

The mortgage calculator publishes a mortgage report as shown on the display screen 19b00 in FIG. 19b. This report indicates the loan amount 19b05, the rate 19b15, the term 19b10, and the payment 19b20. In addition, the period 19b25, the date 19b30, the payment 19b35, the principal 19b40, the interest 19b45, the cumulative interest 19b50, and the balance 19b55 are shown.

Figure 19C:
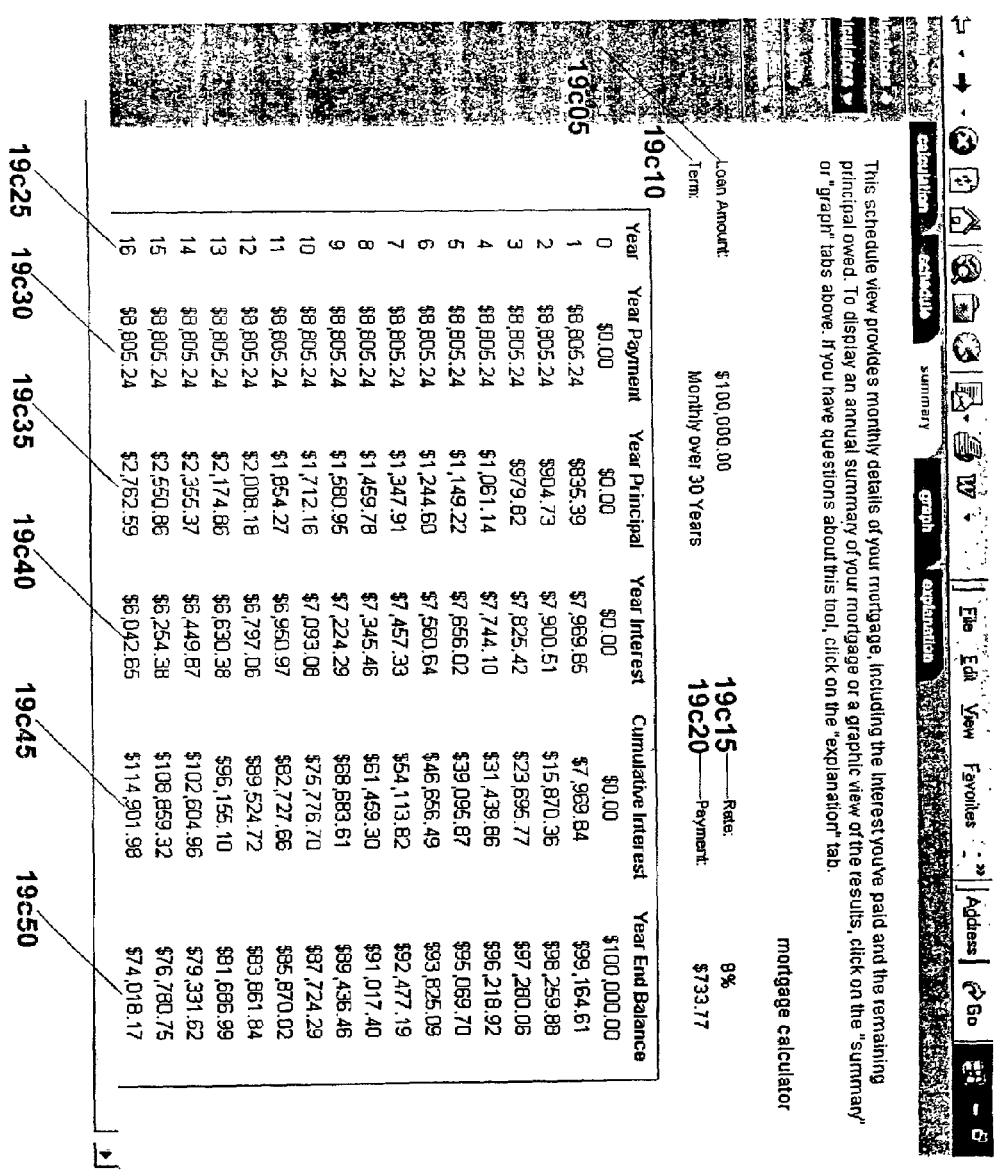

The display screen 19c00 of FIG. 19c is a summary providing monthly details of the mortgage, including the interest that has been paid and the remaining principal owed. The loan amount 19c05, the rate 19c15, the term 19c10, and the payment 19c20 are indicated. In addition, the year 19c25, the year payment 19c30, the year principal 19c35, the year interest 19c40, the cumulative interest 19c45, and the year end balance 19c50 are shown.

Figure 19D:
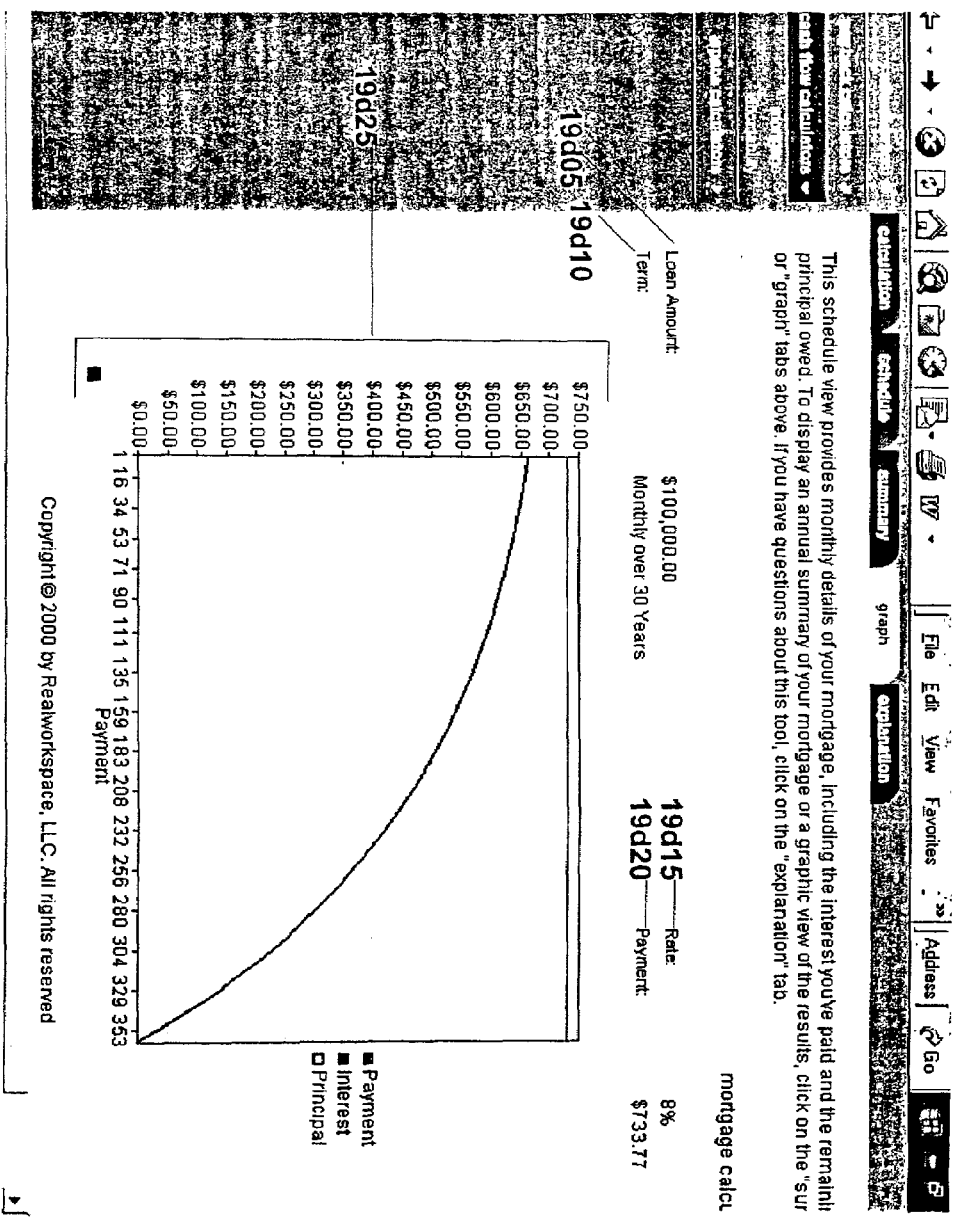

The display screen 19d00 of FIG. 19d is a chart presenting the mortgage report. FIG. 19d shows the loan amount 19d05 the term 19d10, the rate 19d15, and the payment 19d20. It also shows the payment, the interest, and the principal in graph form 19d25.

Figure 19E:
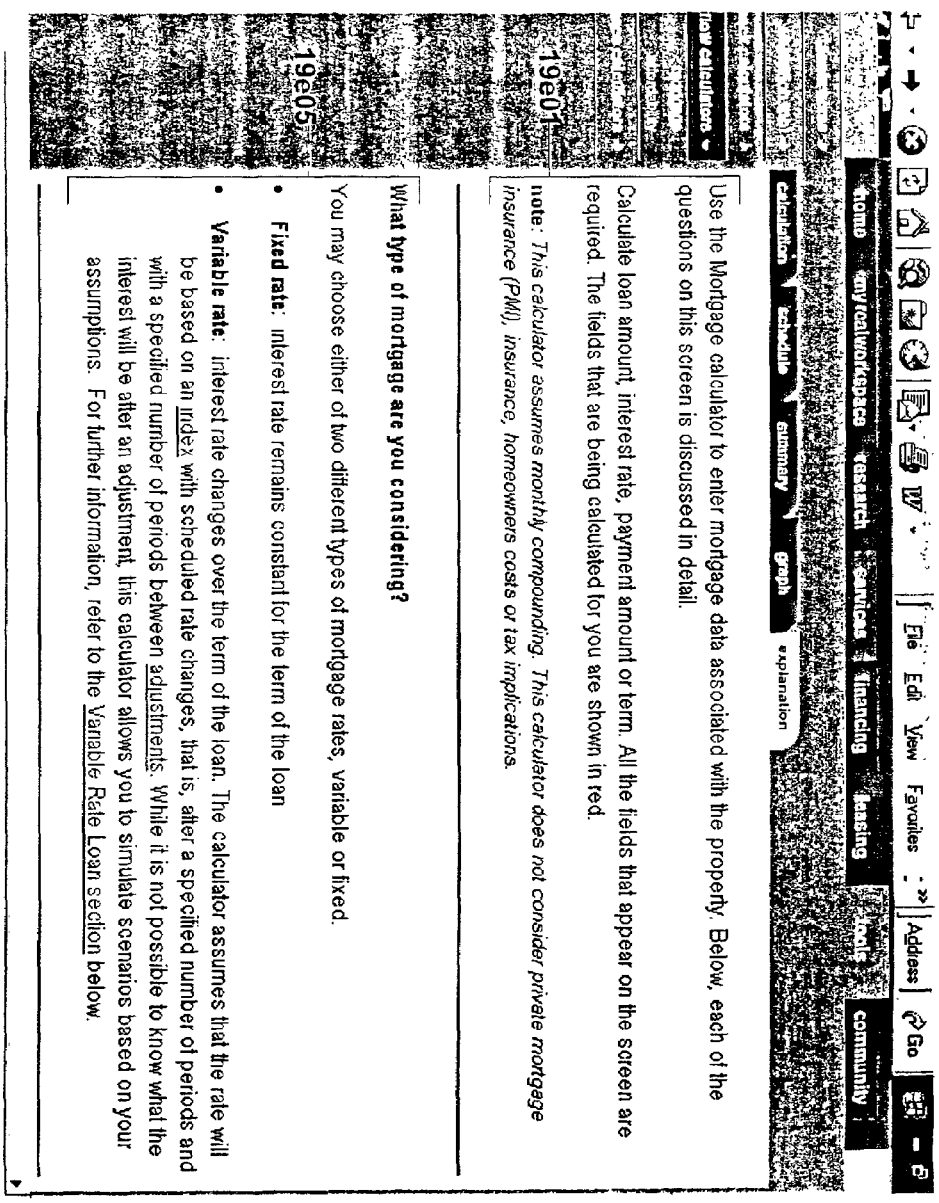
Figure 19E:
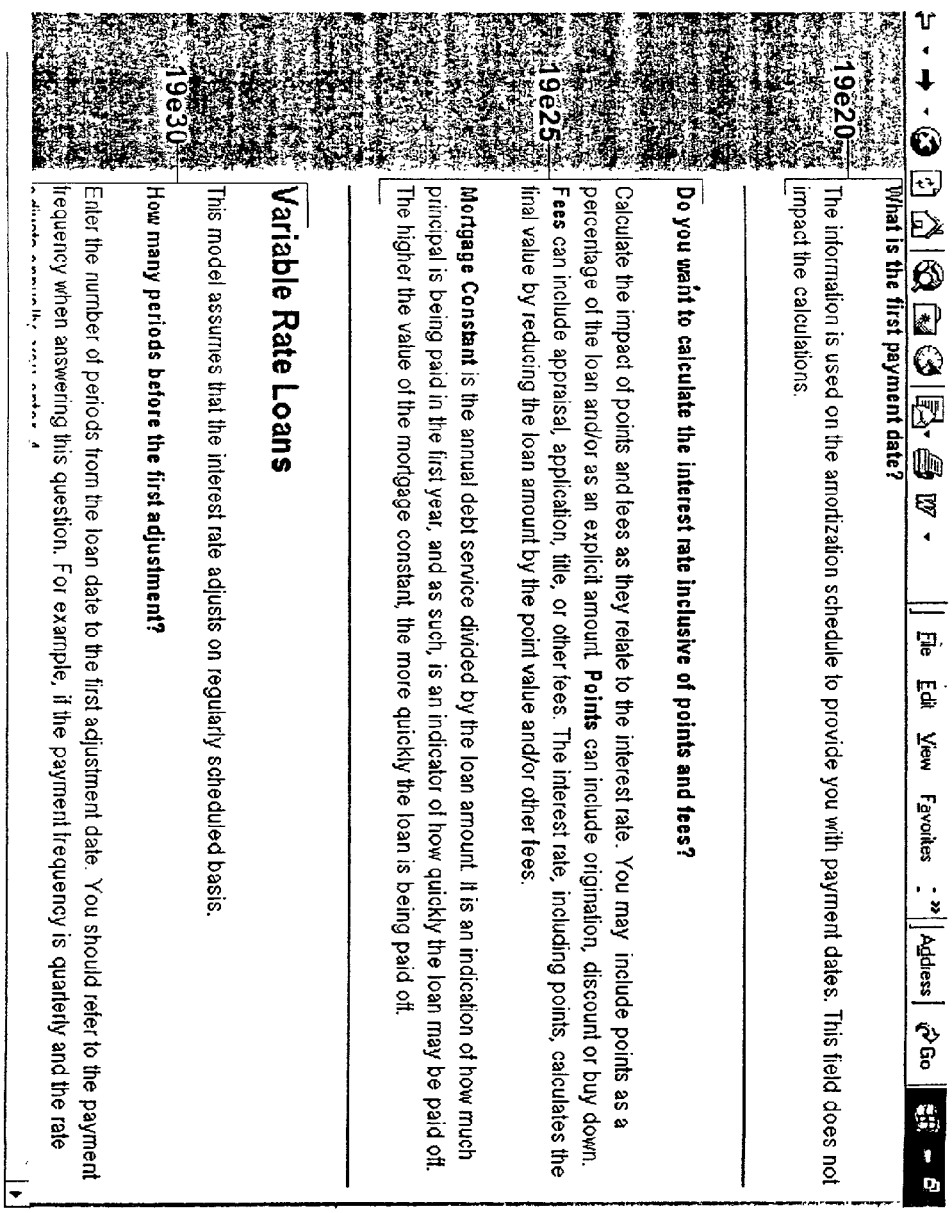

The display screen 19e00 of FIG. 19e displays an explanation 19e01 of the mortgage calculator. The types of mortgages 19e05 and types of amortization 19e10 are explained. Information is included on how to calculate a payoff amount 19e15, find the first payment date 19e20, and calculate the interest rate inclusive of points and fees 19e25. The explanation screen also indicates how to determine how many periods are before the first adjustment 19e30, how many periods are between adjustments 19e35, the maximum rate adjustments 19e40, the minimum rate 19e45, the initial index value 19e50, the margin 19e55, and the predicted index change per adjustment 19e60.

Affordability Calculator

Figure 20B:
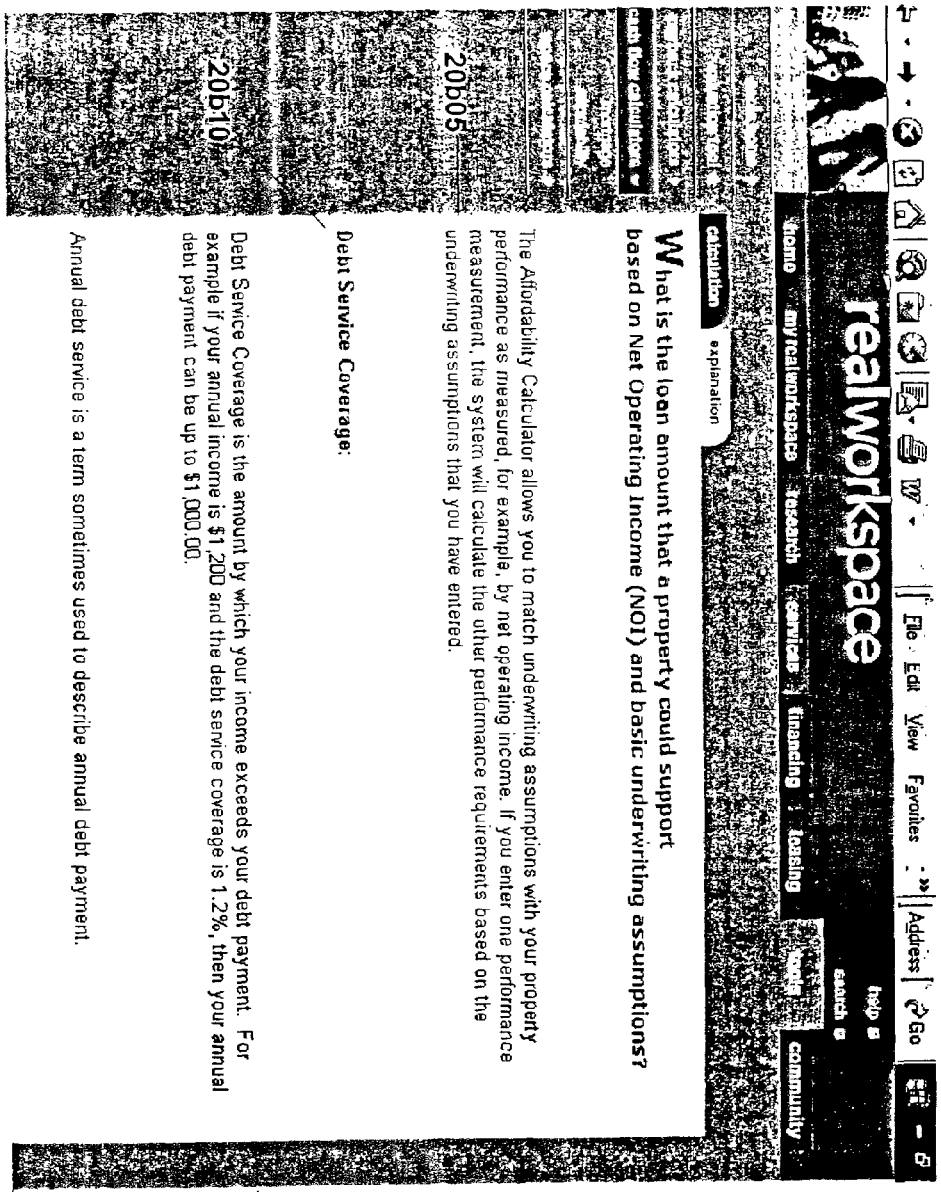

FIGS. 20a–20b, collectively described as FIG. 20, are representative display screens illustrating the calculation of a loan amount that a property can support based upon net operating income and basic underwriting assumptions in accordance with an alternative exemplary embodiment of the present invention. In response to selecting the affordability calculator tool at the Web site hosted by the property services server platform 145, the user is greeted with a representative display screen 20a00 shown in FIG. 20a. This tool allows the user to calculate the affordable loan amount based on the Net Operating Income (NOI) and basic underwriting assumptions. Display screen 20a00 of FIG. 20a prompts the user to enter information on numerous assumptions. This display screen 20a00 allows the user to enter the property type 20a05, the annual net operating income 20a10, the annual debt service 20a15, the loan amount 20a20, the property value required 20a25, and then calculates the capitalization rate 20a30. In addition, the user can enter the debt service coverage 20a35, the payment frequency 20a40, the loan term 20a45, the interest rate 20a50, and the loan-to-value ratio 20a55.

FIG. 20b displays an explanation screen 20b00 for the affordability calculator. An explanation 20b05 of the affordability calculator, how to use the affordability calculator, and an explanation 20b10 of debt service is included.

Tenant Space Planning Calculator

Figure 21A:
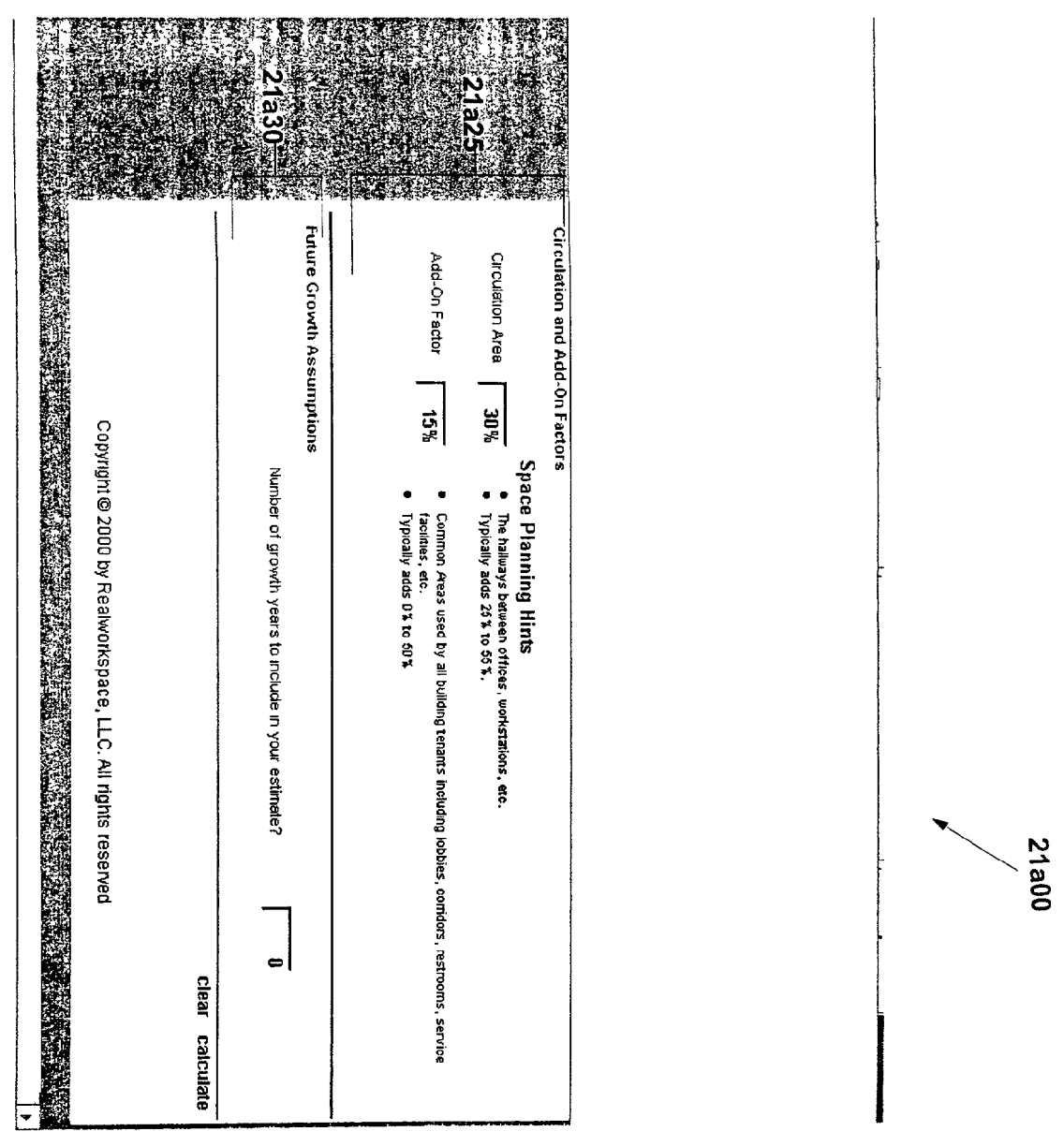
Figure 21B:
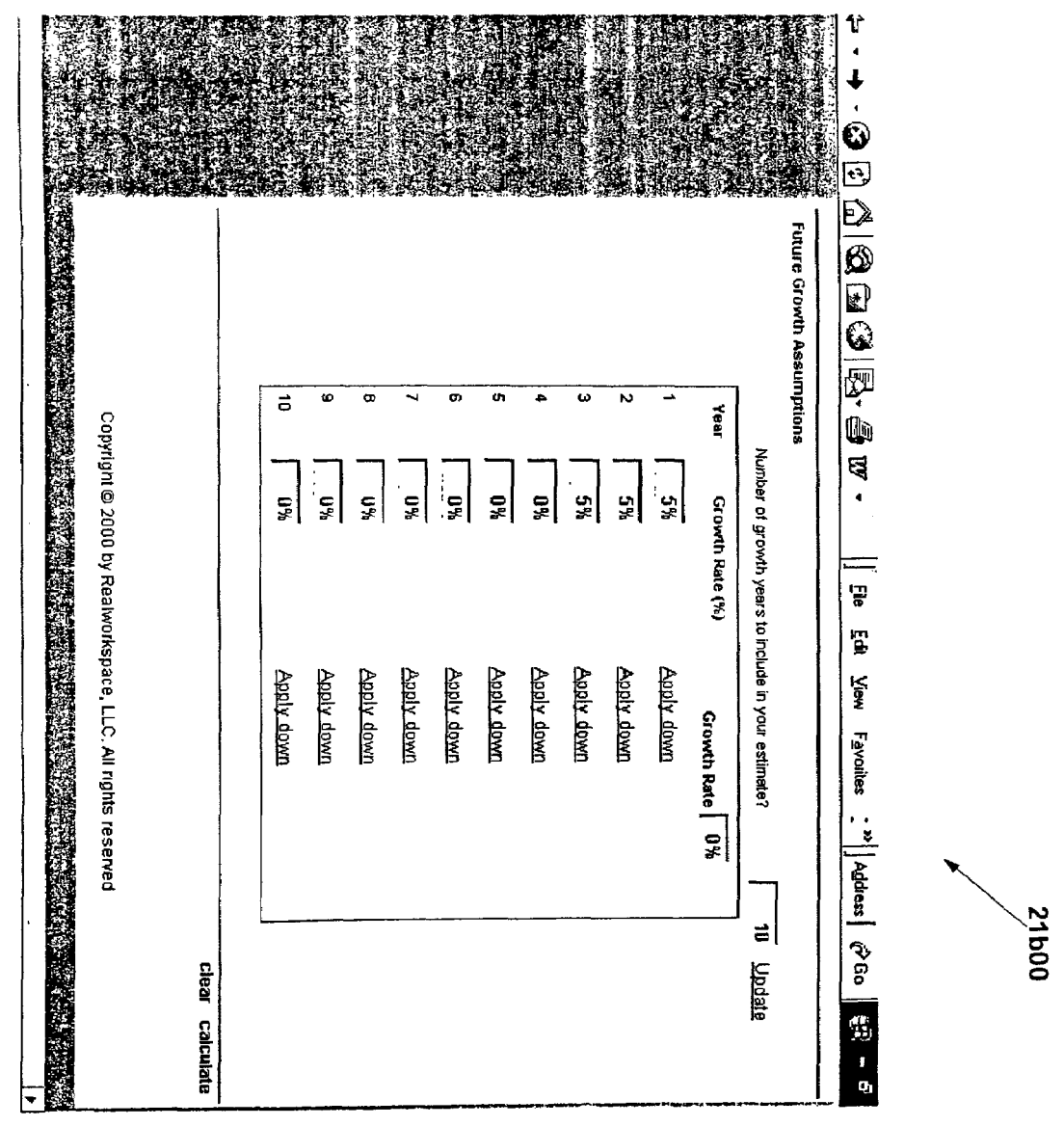
Figure 21D:
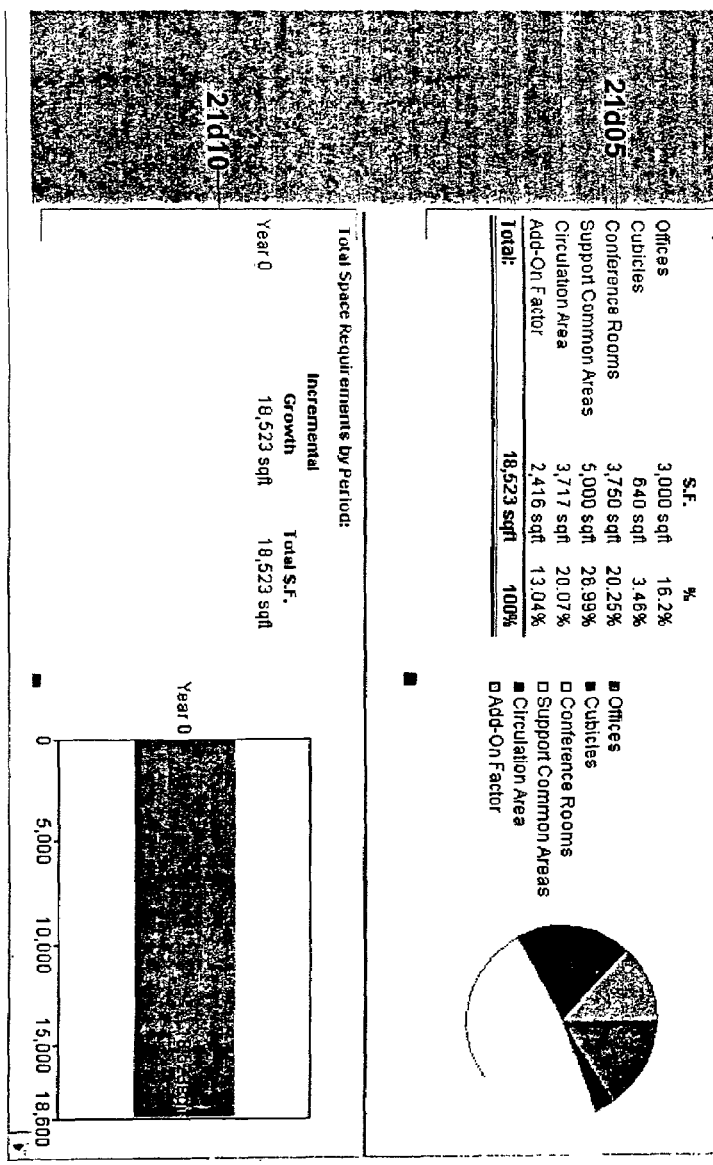
Figure 21E:
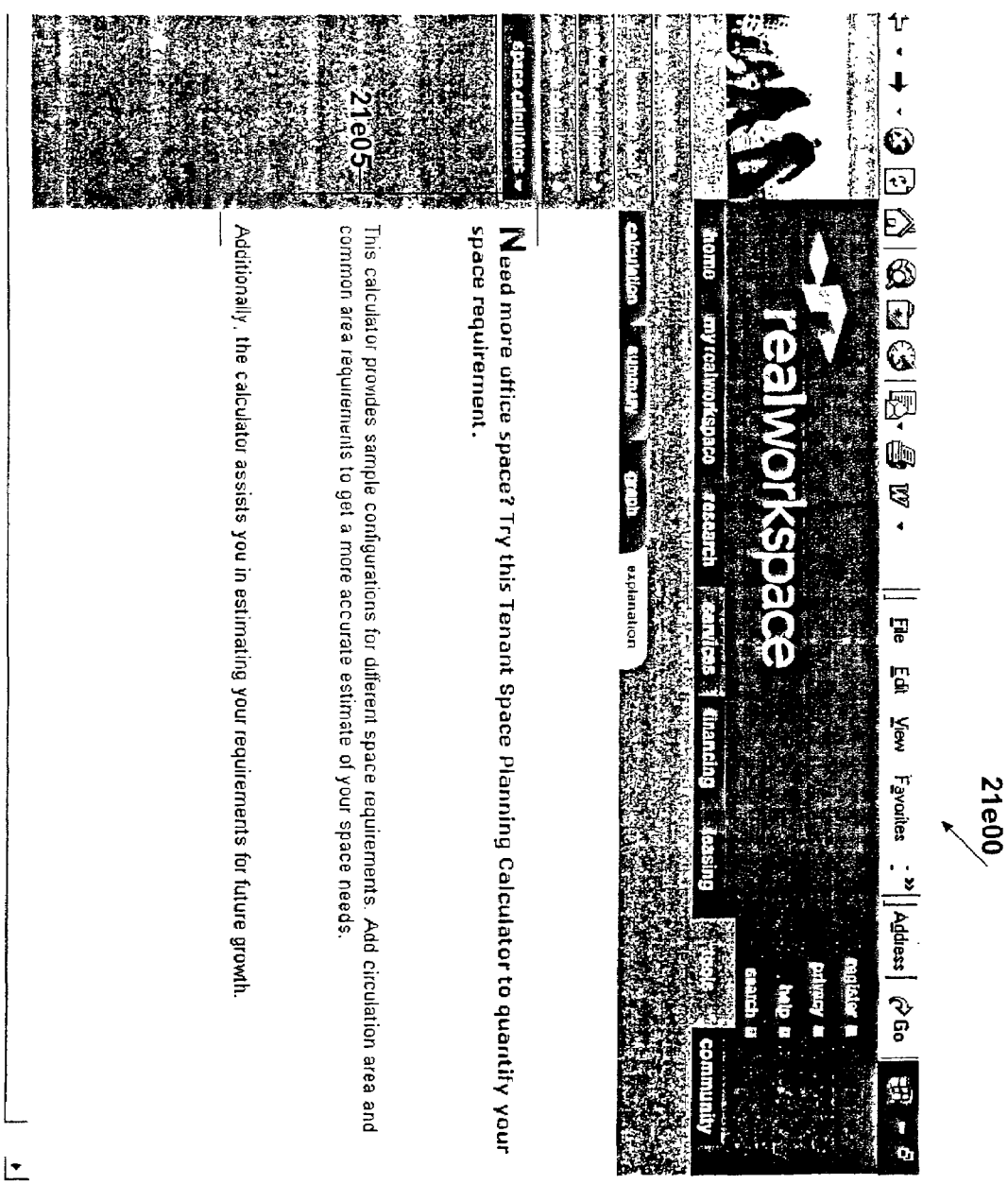

FIGS. 21a–21e, collectively described as FIG. 21, are representative display screens illustrating space calculations in accordance with an alternative exemplary embodiment of the present invention. In response to selecting the tenant space planning calculator tool at the Web site hosted by the property services server platform 145, the user is greeted with a representative display screen 21a00 shown in FIG. 21a. This tool allows the user to calculate how much office space is needed. FIG. 21a prompts the start of a new tenant space planning calculation. In 21a05, the user inters information on whether offices should be included and the total number of offices required. The length, width, and total square feet for CEO, partner, director, and manager offices is shown. The total units of each office types is entered. In 21a10, the user inters information on whether cubicles should be included and the total number of cubicles required. The length, width, and total square feet for supervisor, large, medium, and small cubicles are shown. The total units of each cubicle type is also entered. In 21a15, the user enters information on whether conference rooms should be included and the total number of conference rooms required. The length, width, and total square feet and capacity for board rooms, large conference rooms, small conference rooms, and small meeting rooms are shown. The total units of each type of conference room is entered. In 21a20, the user inters information on whether common areas should be included and the total number of common required. The length, width, total square feet, and capacity for large reception areas, small reception areas, print/copy rooms, break rooms, library/file storage, equipment rooms, training rooms, and mail rooms are shown. The total units of each common area type is also entered. In 21a25, the user enters information on circulation and add-on factors. In 21a30, future growth assumptions are made.

If the user access the future growth assumptions option 21a30, she is taken to the display screen 21b, which provides additional details on future growth assumptions.

Upon completing the information requested by the display screens 21a00 and 21b00 shown in FIGS. 21a and 21b, the affordability calculator publishes a summary report on the display screen 21c00 that is shown in FIG. 21c. The quantity, space description, square feet per unit, total space, and subtotal for the offices 21c05, cubicles 21c10, conference rooms 21c15, and common areas 21c20 are shown. The total space required over the lease term 21c25 is displayed. This includes subtotals for all areas, circulation areas, total usable square feet, add-on factor, and total rentable square feet.

The display screen 21d00 of FIG. 21d displays the report results in graph form. The space allocation by space type 21d05 and the total space requirements by period 21d10 are shown.

The display screen 21e00 of FIG. 21e displays an explanation screen 21e00 for the space calculator. An explanation 21e05 of the space calculator and how to use the space calculator is included.

The invention claimed is:

1. A computer-implemented system for determining a valuation of a real estate property in an on-line computing environment, comprising:
   a property management services server;
   a plurality of databases coupled to the property management services server via a distributed computer network; and
   a plurality of client computers, each coupled to the distributed computer network,
   wherein the property management services server hosts a valuation program module for calculating a valuation for a selected real estate property,
   wherein the databases store real estate property-related data, including property comparables data for a plurality of real estate properties,
   wherein each of the client computers represents an entity that is different from at least one entity represented by another one of the client computers, wherein each different entity performs a different role in the valuation of a selected real estate property, and wherein each of the client computers is operable to access the valuation program module operating on the property management services server to input predetermined information about the selected real estate property in accordance with the role of the entity represented by the corresponding client computer in support of a valuation calculation for the selected real estate property, and
   wherein, responsive to receiving the input predetermined information about the selected real estate property from at least two of the plurality of client computers in accordance with the role of the entity represented by the corresponding client computers, the valuation program module operating on the property management services server accesses the property data in at least one of the databases via the computer network to obtain comparables data relevant to the selected real estate property, calculates the valuation for the selected real estate property based on the input predetermined information, and presents the valuation and the comparables data for the selected real estate property.

2. The system of claim 1, wherein the client computers comprise:
   a client computer representing a tenant and operable to input an evaluation of the selected real estate property for a potential purchase or lease;
   a client computer representing a lender and operable to input property financing requirements for the selected real estate property;
   a client computer representing a site visit agent and operable to input an on-site review and analysis of the selected real estate property;
   a client computer representing a property specialist and operable to input property-related expertise information for the selected real estate property; and
   a client computer representing a deal agent and operable to input information regarding screening, negotiating, and closing of property-related transactions related to the selected real estate property.

3. The system of claim 2, wherein the property specialist client computer represents an entity selected from one of:
   a property appraisal specialist;
   a property engineering specialist; and
   a property environmental specialist.

4. The system of claim 1, wherein the property management services server further comprises at least one program module for at least one property valuation tool.

5. The system of claim 4, wherein the at least one property valuation tool comprises at least one of:
   a property valuation tool operable to value an asset for the selected real estate property;
   a payback calculation tool operable to determine a profit from lease improvements, capitalization rates of property payments, and refinancing savings for the selected real estate property;
   a cash flow calculation tool operable to determine payment and loan amounts for the selected real estate property; and
   a space calculation tool operable to determine an amount of required office space in connection with the selected real estate property.

6. The system of claim 5, wherein the payback calculation tool comprises at least one of:
   a lease improvement calculator operable to determine an amount of standard rent that will support building standard improvements for the selected real estate property and an amount of profit that is available from the standard improvements;
   a direct capitalization calculator operable to determine a capitalization rate of payments for the selected real estate property; and
   a refinancing calculator operable to determine refinance loan savings and breakeven terms for a property loan related to to selected real estate property.

7. The system of claim 5, wherein the cash flow calculation tool comprises at least one of:
   a mortgage and amortization calculator operable to determine mortgage payments, principal payments, and interest payments for the selected real estate property; and
   an affordability calculator operable to determine a loan amount for the selected real estate property.

8. The system of claim 1, further comprising a valuation report electronically transmitted to a plurality of the entities for the selected real estate property.

9. A computer-implemented method for calculating an estimate of the value of a property, comprising the steps of:
   entering property details for a selected real estate property into a program module operating on a server via a first one of a plurality of client computers operating in a distributed computing environment in support of a valuation calculation for the selected real estate property, each of the client computers representing an entity that is different from at least one entity represented by another one of the client computers, with each different entity performing a different role in a valuation of the selected real estate property, and each of the client computers being operable to access the valuation program module operating on the property management services server to input predetermined information about the selected real estate property in accordance with the role of the entity represented by the corresponding client computer in support of the valuation calculation for the selected real estate property;
   obtaining comparables data for the property by accessing at least one database accessible in the distributed computing environment, each database storing comparables data for a plurality of properties;
   entering capital expenses, mortgage details, and investment details for the property into the program module via at least a second one of the client computers operating in the distributed computer environment in accordance with the role of the entity renresented by the corresponding client computer;
   determining a value for the property based on the property details, the comparables data, the capital expenses, the mortgage details, and the investment details; and
   presenting a report indicating the value for the property.

10. The method of claim 9, wherein the mortgage details for the property comprise:
    a payment for the property;
    a rate type for the property; and
    a term for the property.

11. The method of claim 10, wherein the investment details for the property comprise;
    a price for the property;
    a future value for the property; and
    a discount rate for the property.

12. The method of claim 9, wherein the step of presenting the report indicating the value of the property comprises electronically transmitting a valuation report comprising the value of the property to a plurality of the entities via corresponding ones of the client computers.

13. The method of claim 9, wherein the step of entering property details comprises at least one of:
    evaluating the selected real estate property for one of a potential tenant purchase and a potential tenant lease;
    supporting lender financing requirements for the selected real estate property;
    supporting on-site review and analysis of the selected real estate property by a site visit agent;
    providing property-related expertise information of a property specialist in connection with the selected real estate property; and
    providing deal agent information related to screening, negotiating, and closing property-related transactions related to the selected real estate property.

14. The method of claim 9, wherein the step of determining a value for the property comprises:
    valuing an asset for the selected real estate property;
    determining a profit from lease improvements, capitalization rates of property payments, and refinancing savings for the selected real estate property;
    determining payment and loan amounts for the selected real estate property; and
    determining an amount of required office space in connection with the selected real estate property.

15. A computer-implemented system for determining a valuation of a selected real estate property, comprising:
    a property management services server hosting a valuation program module for calculating a valuation for a selected real estate property;
    a plurality of databases coupled to the property management services server and storing real estate property-related data, including property comparables data for a plurality of real estate properties; and
    a plurality of client computers, wherein each of the client computers represents an entity that is different from at least one entity represented by another one of the client computers, wherein each different entity performs a different role in the valuation of a selected real estate property, and wherein each of the client computers is operable to input predetermined information about the selected real estate property into the valuation program module in accordance with the role of the entity represented by the corresponding client computer in support of the valuation calculation for the selected real estate property, wherein, in response to receiving the input predetermined information about the selected real estate property from at least two of the plurality of client computers in accordance with the role of the entity represented by the corresponding client computers the valuation program obtains comparables data relevant to the selected real estate property from the property data in at least one of the databases, calculates the valuation for the selected real estate property based on the input predetermined information, and presents the valuation and the comparables data for the selected real estate property via at least two of the client computers.

16. The system of claim 15, wherein the plurality of client computers comprises two or more of:
- a client computer representing a tenant and operable to input an evaluation of the selected real estate property for one of a potential purchase and a potential lease;
- a client computer representing a lender and operable to input property financing requirements for the selected real estate property;
- a client computer representing a site visit agent and operable to input information regarding an on-site review and analysis of the selected real estate property;
- a client computer representing a property specialist and operable to input property-related expertise information for the selected real estate property; and
- a client computer representing a deal agent and operable to input information regarding screening, negotiating, and closing of property-related transactions related to the selected real estate property.

17. The system of claim 15, wherein the property management services server further comprises at least one program module for at least one property valuation tool.

18. The system of claim 15, wherein the at least one property valuation tool comprises at least one of:
- a property valuation tool operable to value an asset for the selected real estate property;
- a payback calculation tool operable to determine a profit from lease improvements, capitalization rates of property payments, and refinancing savings for the selected real estate property;
- a cash flow calculation tool operable to determine payment and loan amounts for the selected real estate property; and
- a space calculation tool operable to determine an amount of required office space in connection with the selected real estate property.

* * * * *

UNITED STATES PATENT AND TRADEMARK OFFICE
CERTIFICATE OF CORRECTION

PATENT NO. : 7,130,810 B2
APPLICATION NO. : 09/766779
DATED : October 31, 2006
INVENTOR(S) : Paul Foster, Robert Rieger and David Shea It is certified that error appears in the above-identified patent and that said Letters Patent is hereby corrected as shown below:

Cover Page, item (73) Assignee, "Genereal Electrical Capital Corp, Stamford, CT (US)" should read -- General Electric Capital Corp, Stamford, CT (US)--.

Signed and Sealed this

Ninth Day of January, 2007

JON W. DUDAS
*Director of the United States Patent and Trademark Office*